United States Patent
Peters et al.

(10) Patent No.: US 7,494,637 B2
(45) Date of Patent: Feb. 24, 2009

(54) THERMAL CONVERSION OF BIOMASS TO VALUABLE FUELS, CHEMICAL FEEDSTOCKS AND CHEMICALS

(75) Inventors: William A. Peters, Lexington, MA (US); Jack B. Howard, Winchester, MA (US); Anthony J. Modestino, Hanson, MA (US); Fredreric Vogel, Villigen PSI (CH); Carsten R. Steffin, Herne (DE)

(73) Assignee: Massachusetts Institute of Technology, Cambridge, MA (US)

( * ) Notice: Subject to any disclaimer, the term of this patent is extended or adjusted under 35 U.S.C. 154(b) by 317 days.

(21) Appl. No.: 09/858,861

(22) Filed: May 16, 2001

(65) Prior Publication Data

US 2002/0082458 A1 Jun. 27, 2002

Related U.S. Application Data

(60) Provisional application No. 60/204,800, filed on May 16, 2000.

(51) Int. Cl.
*C01B 31/30* (2006.01)
(52) U.S. Cl. .................................. 423/439; 423/442
(58) Field of Classification Search ................ 423/439, 423/440, 441, 442
See application file for complete search history.

(56) References Cited

U.S. PATENT DOCUMENTS

| | | | |
|---|---|---|---|
| 4,095,974 A | 6/1978 | Matovich | 75/0.5 B |
| 4,116,759 A | 9/1978 | Janson | 162/32 |
| 4,601,786 A | 7/1986 | Santen et al. | 162/30.1 |
| 4,637,858 A | 1/1987 | Matovich et al. | 162/30.1 |
| 4,692,209 A | 9/1987 | Santen et al. | 162/30.1 |
| 4,710,269 A | 12/1987 | Santen et al. | 162/30.1 |
| 4,738,835 A | 4/1988 | Kiiskila et al. | 423/200 |
| 4,808,264 A | 2/1989 | Kignell | 162/30.1 |
| 4,917,763 A | 4/1990 | Santen et al. | 162/30.1 |
| 5,439,557 A | 8/1995 | Nilsson | 162/30.11 |
| 5,749,937 A | 5/1998 | Detering et al. | 75/10.19 |

FOREIGN PATENT DOCUMENTS

JP 1006191 A 1/1989

OTHER PUBLICATIONS

PCT Search Report, no date.
Stigsson, L., "A New Concept for Kraft Recovery," 1989 International Chemical Recovery Conference, p. 191-194, no month.
Thammachote, N., et al., "Combustion of Lignin Mixtures in a Rotary Lime Kiln". Pulp & Paper Canada, p. 51 (Sep. 1996).
Grant, R., "Quiet Revolution Continues into Totally Effluent-Free Age". Pulp & Paper International, 36(2):53(3), (Feb. 1994).

*Primary Examiner*—Edward M Johnson
(74) *Attorney, Agent, or Firm*—Edwards Angell Palmer & Dodge LLP; George W. Neuner; Lisa Swiszez Hazzard

(57) ABSTRACT

A continuous process for the conversion of biomass to form a chemical feedstock is described. The biomass and an exogenous metal oxide, preferably calcium oxide, or metal oxide precursor are continuously fed into a reaction chamber that is operated at a temperature of at least 1400° C. to form reaction products including metal carbide. The metal oxide or metal oxide precursor is capable of forming a hydrolizable metal carbide. The reaction products are quenched to a temperature of 800° C. or less. The resulting metal carbide is separated from the reaction products or, alternatively, when quenched with water, hydolyzed to provide a recoverable hydrocarbon gas feedstock.

51 Claims, 7 Drawing Sheets

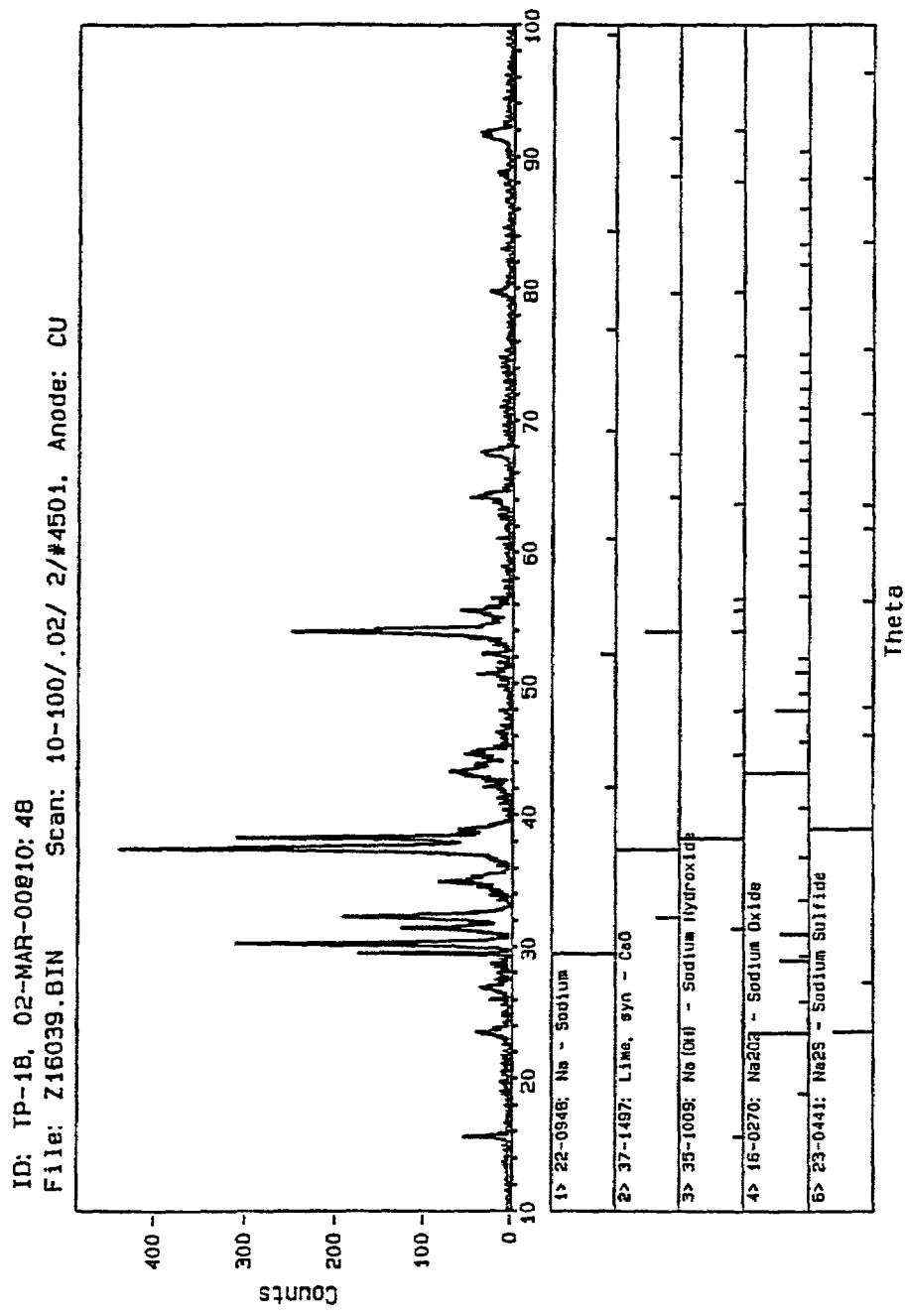
Figure 6: XRD spectrum of sample IP 18

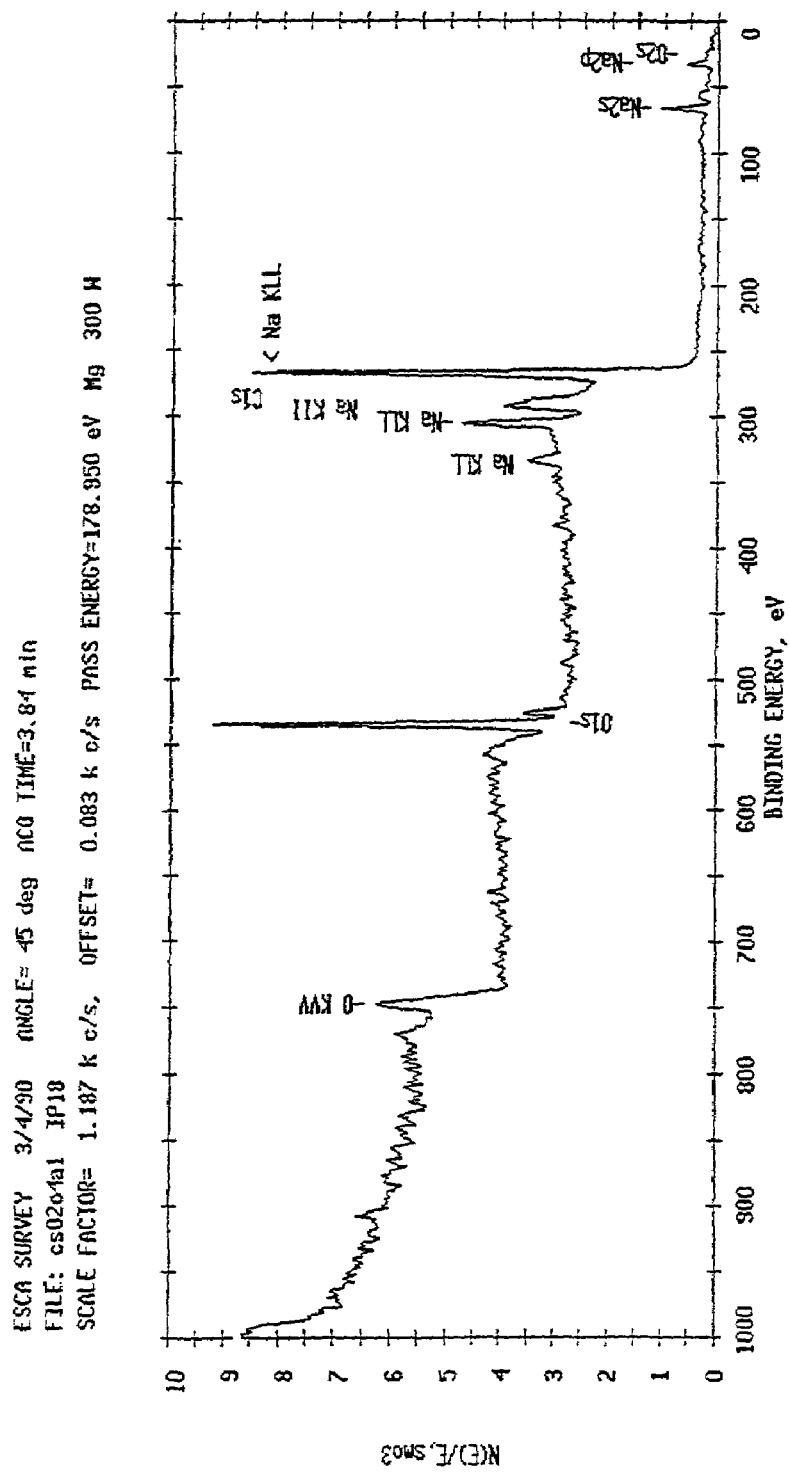
Figure 7: XPS spectrum of sample IP18

THERMAL CONVERSION OF BIOMASS TO VALUABLE FUELS, CHEMICAL FEEDSTOCKS AND CHEMICALS

The present application claims the benefit of U.S. provisional application No. 60/204,800, filed on May 16, 2000, incorporated herein by reference.

This invention was made with government support under Contract No. DE -AC22-92PC92111 awarded by the Department of Energy. The government has certain rights in the invention.

FIELD OF THE INVENTION

The present invention relates to plasma conversion of biomass having lignin and/or cellulose containing materials to valuable fuels, chemical feedstocks and chemicals, particularly, to metal carbides, carbon monoxide and hydrogen while also recovering useful inorganic compounds such as sodium compounds. In particular, waste pulping liquors can be converted to valuable products with the recovery of pulping chemicals.

BACKGROUND OF THE INVENTION

In the pulp and paper industry, economic and environmental factors necessitate recycle of pulping chemicals and recovery of value from the organic residues of pulping. These residues are not traditionally useful for fiber making. Also, it would be environmentally and economically useful to convert other forms of biomass, e.g., wood, municipal and agricultural wastes, energy crops, etc., to premium products. It is useful to recover metals, metal oxides, and metal carbides from any type of biomass that contains metals or other precursors to these substances. In pulping processes, for example, it is desirable to recover from spent pulping liquors compounds that are equivalent to, or closely chemically similar to, spent or partially spent pulping chemicals.

Current technologies use thermal or biological means to convert biomass to energy, e.g., by direct burning or gasification, sometimes with further combustion of the resulting gas to generate mechanical energy or electric power. Thermal and biological means are also used to convert biomass to chemicals or chemical feedstocks. An example is gasification of biomass to form synthesis gas, i.e., mixtures of CO and $H_2$ that, by means of catalytic processing, can be converted to a wide range of fuels and chemicals. Biomass is also being used by at least one automobile manufacturer to fabricate body parts for busses.

Plasma gasification of black liquor has been extensively studied, but lower operating temperatures were utilized and different results were obtained. Few of these technologies, other than niche markets such as energy recovery in the forest products industry have seen substantial, economically successful commercialization.

Chemical treatment of wood and other biomass is the dominant technology now used to produce pulp, i.e. cellulose or cellulose-rich material, for subsequent conversion to paper and paper products. Chemical treatment typically involves digestion of sized pieces of wood etc. in basic (Kraft process) or acidic (sulfite process) liquors at temperatures of 120 to 180° C. for times of 0.5 to 14 hours. By-products of this treatment are so-called waste liquors, which are aqueous suspensions of spent or partially-spent inorganic pulping chemicals and various organic residues that include lignin and lignin-derived compounds. To control costs and avoid environmental damage, it is essential to recycle the pulping chemicals and recover value from the organic wastes.

At present, some premium substances are recovered from organic residues of pulping, but generally at modest scale. For example, the U.S. pulp and paper industry recovered about 30 million gallons per year (c. 1995) of turpentine (a volatile mixture of monoterpenes), which is distilled from various pine woods at temperatures $\leq 132°$ C. during heating in the pulping digester. Tall oil, a by-product of saponified fatty acids (30-60%), resin acids (40-60%, including mostly abietic and pimaric acids), and unsaponifiables (5-10%) are obtained from waste liquors produced in Kraft processing of softwoods. Organic wastes from sulfite pulping remit hexoses, which are fermented to ethanol, and lignosulfonate salts, which are used in leather tanning, ore floatation, resins, drilling mud dispersants, and manufacture of artificial vanilla. These recoveries account for relatively small fractions of the organic wastes. Thus, in 1995, the U.S. pulp and paper industry recovered about 450,000 tons/yr of tall oil. One U.S. firm alone produced about six million tons of waste lignin from pulping.

Most of the lignin and other organic wastes from pulping are "upgraded" by converting them to energy to raise steam for internal process applications, and in some circumstances generation of electric power for external sales. These wastes are combusted in recovery boilers or recovery furnaces, so-named because they also partially process spent pulping chemicals for eventual recycle after further, post-furnace treatment.

The pulping wastes enter the recovery furnaces as concentrated suspensions of solids in water, i.e. as "waste pulping liquors". The solids consist of organic residues from pulping and inorganic substances, primarily spent or partially spent pulping chemicals. These processes are the Kraft process, also called alkaline or sulfate pulping, and the sulfite or acid process. Waste pulping liquors from the Kraft and sulfite processes, respectively, typically may contain about 65 to 70 wt %, and 55 wt % solids in water, and are denoted "black liquors" and "brown" (or "red") liquors.

In the recovery furnaces, waste liquors and their constituents undergo various physical and chemical transformations. It is an instructive approximation to conceptualize a recovery furnace as a process vessel divided into zones dominated by (further) drying and concentration of the waste liquor, devolatilization (pyrolysis) of organics, gasification of organics-derived char and of inorganics (e.g., $2NaOH+CO_2 \text{ - - - >} Na_2CO_3+H_2O$), chemical reduction of inorganics, and oxidation of organics-derived volatiles and of inorganics (e.g., $Na_2S+2O_2 \text{ - - - >} Na_2SO_4$). These phenomena collectively cause the breakdown of organics to intermediates and their subsequent combustion to produce energy, as well as the oxidation and reduction steps that regenerate pulping chemicals or their precursors. For example, in the Kraft process $Na_2S$ (an actual pulping chemical) and $Na_2CO_3$ (a precursor to NaOH another pulping agent) are bottom-tapped from the recovery furnace as a molten mixture ("smelt"). Recovery boilers are the most expensive single capital cost item in a modern Kraft mill, costing about $100 million for a 2500 to 3000 ton per day paper mill (c. 1995 dollars). Safety is an important issue in Kraft recovery boilers, with roughly 1% of these furnaces having at least one accident per year, e.g., smelt-water explosions.

Various patents describe methods for chemical recovery from waste liquors obtained in wood pulp production. U.S. Pat. No. 4,692,209 describes a process where the liquor is fed into the combustion zone (preferably 1000-1300° C.) of a reactor together with a supply of external thermal energy. The vaporized reaction products pass to a cooling zone (preferably 600-900° C.) and a melt or aqueous solution containing inorganic compounds, particularly NaOH, $Na_2S$ and small amounts of $Na_2CO_3$ are removed via a lower outlet. An $H_2$ and CO gas mixture is withdrawn at an upper outlet. Temperature and $O_2$ potential in the combustion zone are controlled by regulation of the energy supply and optional addition of carbonaceous material and/or $O_2$ containing gas. The liquor is first subjected to low temperature pyrolysis, e.g., at 600-800° C. and the $Na_2CO_3$ and reduced solid carbon mixture obtained is fed to the combustion zone to form small amounts of NaOH and $Na_2CO_3$. The mixture is scrubbed with gas from the pyrolysis to obtain an aqueous white liquor containing NaOH, NaHS and $Na_2CO_3$. Melt-$H_2O$ explosions are avoided.

U.S. Pat. No. 4,710,269 describes a method for increasing capacity and improving the chemical recovery process when using a conventional soda recovery boiler for recovering chemicals from a spent sulfate liquor. The sulfate liquor is supplied to a liquor gasifier while external energy independent of combustion is simultaneously supplied. The temperature and oxygen are controlled independently. The gas product thus obtained containing Na, CO and $H_2$ is introduced into a soda recovery boiler and organic constituents are withdrawn primarily as a gas.

U.S. Pat. No. 5,439,557 describes a process for recovering energy and chemicals from a spent liquor which, after thickening to a dry content of 50-90%, is fed into a reaction chamber having a plurality of zones. The liquid phase is converted to a steam phase. Spent liquor is thermally decomposed to form gaseous organic substances and solid and/or molten organic and inorganic substances, which are reduced and oxidized during the thermal decomposition with oxygen or oxygen containing gas being supplied to the reaction chamber in a controlled amount to maintain the reactions, which comprise combustion of organic substances, and a bed of solid and/or molten substances is formed in a lower temperature zone in the reaction chamber. The steps are carried out during exposure to low frequency sound.

In U.S. Pat. No. 4,808,264, a process is described for recovering chemicals and energy from cellulose waste liquors, preferably black kraft liquor. First, the concentrated black liquor is gasified in a pressurized reactor by flash pyrolysis at 700 to 1300° C. (by introducing oxygen or an oxygen containing gas into the reactor), normally 800-900° C., whereby an energy rich gas is produced and wherein the inorganic chemicals of the black liquor are contained in the form of molten suspended droplets, mainly comprising sodium carbonate and sodium sulfide. Then, the gas from the gasification reactor is rapidly cooled through direct contact with water, and with green liquor, which is formed when the molten droplets and hydrogen sulfide are dissolved in the quench liquid. The cooled gas subsequently passes through a scrubber. In the lower section of the scrubber, the gas is washed with green liquor and, in the upper section of the scrubber, the gas is washed with sodium hydroxide (or carbonate) solution and water for complete removal of any remaining sulfur bearing components. Finally, the sulfur and particulate free gas is used as a fuel for generating steam or for production of electric power.

U.S. Pat. No. 4,917,763 describes a method for recovering chemicals from spent liquors while utilizing energy liberated during the process. The spent liquors are gasified and partially disintegrated in a reactor with thermal energy independent of combustion being supplied by a plasma generator simultaneously to the reaction zone. Then, the resultant melt containing mainly sodium sulfide is separated at substantially the temperature prevailing at combustion. The gaseous product thereby obtained is quenched in a quenching and cooling zone to a temperature below 950° C. The product gas contains substantially no sulfur impurities. Alkali compounds in liquid form are also obtained from the quenching and cooling zone.

In U.S. Pat. No. 4,601,786, a method is described for recovery of chemicals from waste liquor from wood pulp processes, primarily black liquor, while utilizing energy liberated. Controlled total vaporization of the pulp waste liquor at high temperature and low oxygen potential is achieved by external supply of energy using a plasma generator. Subsequent condensation and separation of a melt or water solution is obtained which, without causticizing, can be used for the preparation of white liquor. Also, an energy rich gas consisting primarily of carbon monoxide and hydrogen, and mainly free of sulfur, is obtained.

U.S. Pat. No. 4,116,759 describes a method for regenerating pulping or bleaching chemicals from spent liquor containing salts of polybasic organic acids. The liquor is evaporated and then burned so that organic matter will be discharged as carbon dioxide and water, and a carbonate residue is formed. Dissolving the residue in water regenerates the alkaline salts for pulping or bleaching.

In U.S. Pat. No. 4,738,835, a method is described for recovering alkali chemicals from a material containing dissolved inorganic compounds. The material is gasified in a reactor by an external heat source at a temperature over about 1000° C. producing a gas in which the sodium is substantially in a gaseous state. The gas is cooled by contact with an adequate amount of cooled recirculated solid particles in a sublimation chamber of a circulating bed cooler to decrease the temperature of the gas rapidly below the sublimation temperature of the sodium compounds so that sodium compounds are condensed onto the solid particles. The gas and solid particles pass upwardly through a heat exchanger to cool the solid particles and some of the solid particles are removed from the gas.

JP 1006191 A describes a recovery process wherein the liquor is fed at the top of a reaction zone while external heat energy is simultaneously fed independently of the burning. The temperature and oxygen potential in the reaction zone are independently controlled by the controlled heat energy fed and, if necessary, feeding carbon material and/or oxygen containing gas. Thus, all of the alkali and sulfur are separated from the gaseous phase and combined to the fusion phase which is removed from the reactor. The organic portion of the spent liquor is in the gaseous state.

At the 1989 International Chemical Recovery Conference, L. Stigsson, "A New Concept For Kraft Recovery," pp. 191-194, disclosed the use of plasm generators for supporting and stabilizing the gasification reactions for recovery of chemicals and energy from kraft waste liquors.

As reported by R. Grant, *Pulp & Paper International*, Vol. 36, No. 2, page 53 (3) (Feb. 1994), the trend to burning higher black liquor solids continues. Available processes allow more efficient burning of black liquor in the recovery boiler at up to 90% solids reduction efficiency or better and sulfur dioxide emissions are significantly reduced. Gasification is seen as the key to unlocking incremental recovery capacity for mills where the recovery boiler is the bottleneck. Gasification turns black liquor into two separate streams, one (from the organic components) that can be burnt in a gas turbine or elsewhere, and another (from the inorganic components) that provides the green liquor.

However, none of the reported processes use a non-combustion conversion process for obtaining higher value compounds from the organic materials in the spent pulp waste liquors. Further, none of the processes convert other sources of biomass to higher value compounds. Thus, there still exists a need for a commercial process to convert biomass to higher value fuels and chemicals.

SUMMARY OF THE INVENTION

The present invention provides chemical methods for converting biomass, including organic residues in waste pulping liquors, containing materials having lignin and /or cellulose, or other such organic compounds, to valuable products, i.e. metal carbides, acetylene, ethylene, or other hydrocarbons useful as fuels or chemical feedstocks, and to CO and $H_2$. Further, when the biomass includes pulping residues, the methods of the present invention can concurrently recover inorganic pulping chemicals for reuse or recycle.

Thus, the method comprises continuously feeding into a reaction chamber at a temperature of at least 1400° C. a biomass material with a metal oxide or metal oxide precursor, wherein the metal oxide is capable of forming a hydrolizable metal carbide, to form reaction products; and quenching the reaction products to a temperature of 800° C. or less. Preferably, the resulting metal carbide is separated from the reaction products. Alternatively, when water is used for quenching, the metal carbide is hydrolyzed in the quenching step producing a hydrocarbon gas, e.g., acetylene. When the biomass is a waste pulping liquor containing significant amounts of sodium, Na and/or $Na_2S$ are directly produced by preferred methods of the present invention.

The methods of the present invention are of particular interest for, but by no means limited to, applications in the pulp and paper industry, where economic and environmental factors necessitate recycle of pulping chemicals and recovery of value from the organic residues of pulping. These residues are not traditionally useful for fiber making. The invention is broadly applicable to converting all forms of biomass, e.g., wood, municipal and agricultural wastes, energy crops, etc., to the premium products noted above. In this regard the invention also provides a means for recovering useful metals, metal oxides, and metal carbides from any type of biomass that contains metals or other precursors to these substances, for example compounds equivalent to, or closely chemically similar to spent or partially spent pulping chemicals.

In preferred embodiments of the present invention, the biomass is converted to metal carbides such as $CaC_2$ by reacting CaO (or other metal oxides) with the biomass. Preferably, a plasma generator is used to obtain the higher temperatures needed for $CaC_2$ formation whereas conventional plasma gasification of biomass employs lower temperatures. Thus, the present invention provides for "carbidization" of biomass including waste pulping liquors instead of the gasification provided by conventional processes. Preferably, 10% or more by weight, more preferably 50% or more by weight, of the initial carbon in the biomass is converted to a metal carbide such as, for example, $CaC_2$.

In another embodiment of the invention, when the biomass is a waste pulping liquor (or other source containing substantial sodium compounds), preferably 10% or more by weight, more preferably 50% or more by weight, of the sodium is converted to elemental Na. When the biomass contains sulfur and sodium compounds, the sodium and sulfur are converted to $NaS_2$ and, preferably, excess sodium is converted to elemental Na.

As used in the present application, the term "biomass" refers to living matter formed by photosynthesis, for example plants, trees, grasses etc., as well as useful materials and wastes derived from living sources including animals and humans in time scales that are small compared to those for the formation of fossil fuels. Examples of useful materials and wastes derived from living sources include municipal wastes, as well as finished products, recycled materials, and wastes from agriculture, forestry, construction, and human and animal habitat. Thus, biomass includes any of wood, cellulose, hemicellulose, lignin, lignocellulosic materials, or mixtures thereof, paper, as well as wastes and residues from forests, animals, and humans, including municipal waste, that are at least partially organic in their makeup, and any plant material or residue of a plant, whether such plant or residue is living or not.

As used herein, the term "carbideable char carbon" ("CCC") or "carbideable carbon" means the amount of carbon remaining in the feed after oxygen in the feed is converted stoichiometrically to carbon monoxide.

BRIEF DESCRIPTION OF THE DRAWINGS

FIG. 6 is a graph illustrating a XRD ("x-ray diffraction") spectrum providing information about the molecular identity of crystalline substances produced in accord with the invention in Example IP18.

FIG. 7 is a graph illustrating a XPS ("x-ray photoelectron spectroscopy") spectrum identifying particular types of chemical bonds at or near the surface of solids produced in accord with the invention in Example IP18.

DETAILED DESCRIPTION OF THE INVENTION

Figure 1:
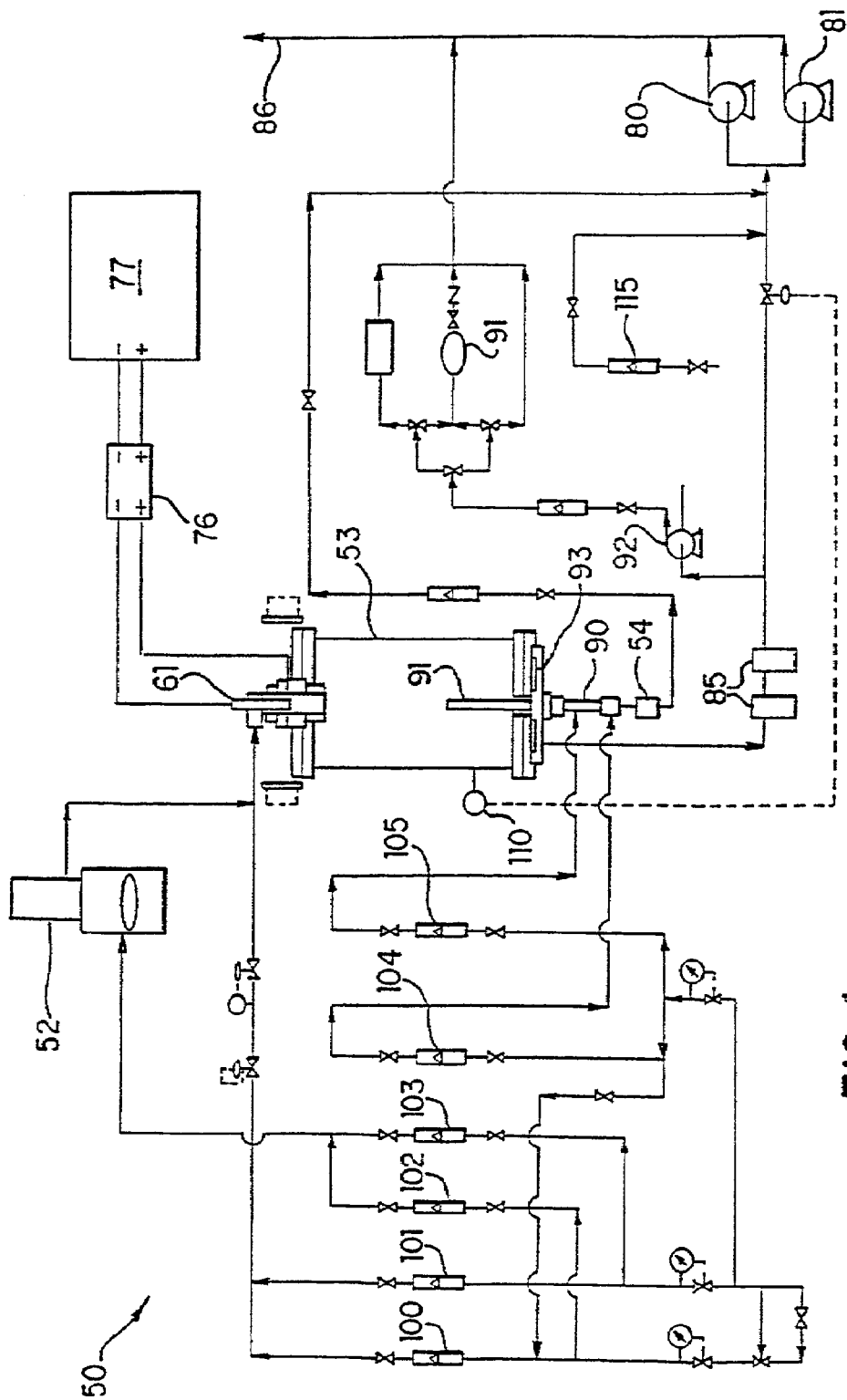
FIG. 1 illustrates schematic diagram of a plasma reactor and associated gas and solids processing equipment including product collection equipment used in a laboratory operation of an embodiment of the process of the present invention.

The present invention provides a new process chemistry to convert biomass including residues of lignocellulosic pulping operations, i.e., waste pulping liquors, to value-added products, i.e., acetylene, ethylene, other hydrocarbons, CO and $H_2$. CO and $H_2$ and acetylene are valuable as fuels and as chemical feedstocks. Ethylene can be used as a fuel although it is of far greater value as a feedstock, for example for making polyethylene polymers of various molecular weights and densities. In this invention acetylene is obtained by converting a portion of the biomass carbon to calcium carbide $CaC_2$, or other suitable metal carbide and then producing acetylene by hydrolysis of the metal carbide. Ethylene is obtained by hydrogenation of the acetylene produced in this way. Thus in this regard what is being claimed is a method of converting biomass to ethylene via metal carbides.

Further, when the starting material contains spent or partially spent pulping chemicals, as would typically be the case for residues of lignocellulosic pulping, this invention provides a means to convert or recycle those substances to pulping chemicals or to products that can readily be converted to pulping chemicals. Examples of pulping chemicals obtainable from the methods of this invention are: NaOH, $Na_2S$, $Mg(HSO_3)_2$, $Ca(HSO_3)_2$, and $Na_2SO_3$. Pulping chemical precursors obtainable from this invention are Na, $Na_2CO_3$, and $Na_2O_2$.

At least two major commercial benefits of this invention are (1) conversion of organic substances in pulping residues to value-added products plus recovery of pulping chemicals; and (2) conversion of biomass to high quality fuels, chemical feedstocks, and chemicals.

In accord with the present invention, biomass is heated with an inorganic metal oxide such as, for example, calcium oxide, to a temperature of at least 1400° C. and more preferably to 1700° C. or higher for a time period of about 0.1 to about 100 seconds. Desired reaction products are preserved by quenching the high temperature effluent stream of the heating furnace or reaction chamber to 800° C. or lower, preferably 400° C. or lower, at a rate of cooling sufficiently high to inhibit substantial product losses. Undesired product losses can be caused by reactions of desired products with carbon monoxide or other gases present in the furnace effluent. The heating can be provided by any suitable means such as by combustion of a suitable fuel but is preferably provided by a thermal plasma. In the case of direct heat exchange, e.g., by combustion, the oxidant or the fuel can be preheated, and air can be enriched with an oxidant such as $O_2$. However, the amount of added oxidant should be carefully determined by stoichiometry when high yields of metal carbide are desired because carbon in the feedstream can preferentially form carbon monoxide under certain operating conditions, thus, lowering the yield of carbide.

When the methods of the present invention are applied to pulping residues, the residues preferably are preconcentrated by evaporation of water prior to introduction of the residues to the high temperature heating region of the reaction chamber. Preferably, the preconcentration is carried out by evaporating water using heat recovered from the high temperature furnace.

In the methods of this invention, when the reactants are heated as described, organic, inorganic, and metal-organic substances from within the biomass and/or externally added, react to produce, among other products, metals, metal carbides, metal hydroxides, metal oxides, metal peroxides, metal carbonates, metal sulfides, carbon monoxide (CO), molecular hydrogen ($H_2$), hydrogen sulfide ($H_2S$), and/or sulfur dioxide ($SO_2$). The yields and particular products will depend upon the elemental composition of the feed, upon whether or not exogenous metal oxide such as, e.g., CaO, MgO, and the like, is delivered to the furnace with the biomass feedstream, and upon the manner of operation of the furnace including steps taken to preserve products, for example, the rate of quenching of effluents of the high temperature reaction, and, for example, the position of the tail of the plasma flame when one or more plasma torches are used to heat the feedstock.

Specific examples of process chemistries that can be obtained with this invention are described below. However, in general:

(1) organically-bound elemental oxygen in the biomass feed will be converted to CO by carbon in the biomass feed;
(2) substantial portions of the biomass feed carbon remaining after (1) can be converted to calcium carbide if stoichiometrically sufficient quantities of metal oxide, e.g., CaO, are fed to the furnace with the biomass; and
(3) sulfur in the feed can be converted to sodium sulfide ($Na_2S$) if there is stoichiometrically sufficient sodium, i.e., in the biomass feed or added to the feed as a separate reactant. $Na_2S$ is a valuable pulping chemical.

In pulping residues, the organic constituents in the feed can include lignin and lignin-derived compounds, whereas the inorganic constituents include spent or partially spent pulping chemicals, typically consisting of salts and bases of the alkali and alkaline earth metals. The composition of the metal-organics depends on the pulping technology and can include metallic salts of lignosulfonic acids. Further information about the substances found in liquors from the chemical pulping of wood is illustrated in Table 1.

TABLE 1

Organic And Inorganic Substances In Fresh And used Liquors From Chemical Pulping of Wood

| Pulping Process | Typical Composition of Fresh Pulping (Cooking) Liquor | Waste organic Products Of Pulping |
|---|---|---|
| Kraft (Sulfate, Alkaline) | 12.5 wt % Solution of NaOH, $Na_2S$, $Na_2CO_3$ NaOH 58.6% $Na_2S$ 27.1% $Na_2CO_3$ 14.3% | Lignin & Lignin-derived Products, e.g., Alcohols Acids Mercaptans |
| Sulfite (Acid) | 7 wt % Solution of $SO_2$ As: $H_2SO_3$ (4.5 wt %) $Mg(HSO_3)_2$ (2.5 wt %) ($Mg(OH)_2$, (Na+), $NH_4OH$, $Ca(HSO_3)_2$ can also be used) | Lignin & Lignin-derived Products, e.g., lignosulfonic acids and metal (e.g., Mg, Ca) salts thereof |

Preferably, an exogenous metal oxide, e.g., CaO, is added to the pulping liquor to convert organic carbon in the residues to metal carbides such as $CaC_2$, which can be hydrolized to produce acetylene.

To effect desired reactions in the proper sequence, the biomass and the metal oxide, preferably CaO, (and any other added substances) and their reaction products can be contacted with one or more plasma torches in stages. In one embodiment of the process, metal carbide products, which are solids at lower temperatures, are separated from the gaseous CO and $H_2$. Then, in one or more separate reaction vessels, the carbides are selectively reacted with water or steam to generate acetylene gas, a valuable fuel and chemical feedstock. Other valuable hydrocarbons besides, or instead of acetylene, can be generated, depending on the metal element in the carbide, e.g., methane from the hydrolyzation of beryllium carbide and methyl acetylene or propadiene from the hydrolyzation of magnesium carbide. Further, ethylene can be produced from the acetylene by further reaction with hydrogen ($H_2$) in a separate reactor. If substantial amounts of sodium carbide, or sodium bicarbide, or both are formed, these products can be converted to valuable pulping chemicals such as sodium sulfide and sodium sulfite, by treating these carbides with $H_2S$ or sulfurous acid, respectively. If sufficient CaO, is included with the feed the formation of substantial amounts of sodium carbide, or sodium bicarbide seems unlikely because the formation of calcium carbide is thermodynamically favored.

Thus, the methods of the present invention can provide: (1) more valuable products from lignin and lignin derived substances and other organic residues of pulping; (2) the ability to upgrade organic residues and regenerate pulping chemicals in one integrated process; (3) major downsizing and possibly total elimination of the high capital cost and not totally accident free, waste liquor recovery boilers currently used to burn organic residues and initiate pulping chemicals recovery; (4) the ability to generate and recycle sodium sulfite ($Na_2SO_3$), which is now of interest for innovative chemical pulping technologies; (5) the ability to recycle $Ca(HSO_3)_2$, which historically has been unrecoverable from sulfite pulping technologies; (6) the deodorization of mercaptans and other sulfur compounds.; and (7) a process for converting all forms of biomass, including but not limited to, wood, wood wastes, energy crops, municipal solid waste, etc. to metal carbides, acetylene, ethylene, other hydrocarbon fuels and chemical feedstocks, and $H_2$, and CO.

Illustrative process chemistries are presented below as examples for the following four exemplary cases: (1) Conversion of biomass more generally e.g., wood, municipal wastes, trees or parts thereof, energy crops, straw, grass, animal, agricultural, and human wastes, sewage sludge, plants living or dead, etc. to value-added products; (2) Conversion of waste pulping liquors to valuable products with regeneration of pulping chemicals; (3) Production of ethylene from biomass via metal carbides; and (4) a variation on Case (2) where sodium carbides, or sodium bicarbides, or both, are formed in the process in substantial quantities. That can occur if insufficient calcium oxide (CaO) is fed to the furnace. To illustrate Case (4), lignin (empirical formula $C_5H_6O_2$) is used to represent organic substances in, or derived from, pulping liquors as well as biomass more generally. Calcium oxide, CaO is used to illustrate the effects of adding a metal oxide to the residue-treatment reactor. Any of a number of other metal oxides, or mixtures of metal oxides, or precursors thereof, which react with organic components of biomass to produce metal carbides that yield valuable hydrocarbon products upon hydrolysis, can be utilized. Many examples of such metal carbides are presented in the book: *Carbides Properties, Production, and Applications*, by T. Ya. Kosolapova, translated from the Russian by N.B. Vaughan, Plenum Press, New York, (1971).

An exemplary process chemistry for the conversion of biomass to valuable fuels, chemical feedstocks, and chemicals is illustrated below using the empirical formulas for cellulose and lignin, two of the major constituents of biomass, and calcium oxide (CaO). However, it is recognized that the processes of the present invention can apply to all forms of biomass and, further, that a variety of metal oxides can be used to form metal carbides that, upon hydrolysis, give useful hydrocarbon fuels or feedstocks:

$$CaO+3C_6H_{10}O_5 \text{ (cellulose)} \text{---} >CaC_2+15H_2+16CO \quad (1)$$

$$CaO+C_5H_6O_2 \text{ (lignin)} \text{---} >CaC_2+3H_2+3CO \quad (2)$$

Reaction (3) illustrates reaction of the $CaC_2$ with water or steam to form acetylene plus calcium hydroxide:

$$CaC_2+2H_2O \text{---} >Ca(OH)_2+C_2H_2 \quad (3)$$

It is recognized that other metal carbides also will react with water or steam to form acetylene or other hydrocarbons, plus the metal hydroxide. Such other metal carbides also are useful in the practice of the present invention.

By heating the metal hydroxide, the metal oxide can be regenerated for recycling to the high temperature furnace where it will react with more biomass. This is illustrated by regeneration of calcium oxide (lime, or quicklime) from calcium hydroxide (slaked lime), but it is recognized that other metal oxides can be regenerated by heating their hydroxide.

$$Ca(OH)_2 \text{---} >CaO+H_2O \quad (4)$$

An exemplary process chemistry for the conversion of waste pulping liquors to valuable products with recovery of pulping chemicals is illustrated below. Waste pulping liquors typically contain carbon, hydrogen, sulfur, oxygen, sodium, and traces of calcium, and are composed of organic and inorganic solids suspended in water (see Table 7, below). Here, the process chemistry is illustrated for the case of reactions of dried black liquor char (DBLC). This DBLC material is the solid product obtained by drying black liquor and then pyrolyzing the resulting material. The process chemistry can be represented by the following sequence of steps labelled Reactons (5) to (9):

$$Na_{1.18}C_{2.81}H_{0.86}S_{0.09}O_{1.88} \text{ (DBLC)} \text{--->} 1.18\text{ Na}+0.0.43 \\ H_2+0.09\text{ S}+1.88\text{ CO}+0.93\text{ } C_{CCC} \quad (5)$$

where the formula on the left hand side is an approximate empirical formula for a sample of DBLC obtained from a paper manufacturing company, and the symbol $C_{CCC}$ refers to feedstock carbon that is not consumed in converting feedstock oxygen to CO. For the DBLC case of Reaction (5) 0.93 mole of this material, which may be called "carbideable char carbon" (CCC), is produced. Up to ⅔ of this CCC can be reacted with CaO to produce calcium carbide. This is illustrated by Reaction (6):

$$0.93\text{ } C_{CCC}+0.31\text{ CaO}=0.31\text{ } CaC_2+0.31\text{ CO} \quad (6)$$

In general, the elemental sulfur and sodium products [Reaction (5)] will further react to form products that can be directly used as pulping chemicals, i.e, $Na_2S$, or which can be easily converted to pulping chemicals, e.g., $Na_2O_2$ (by reaction with water to form NaOH) and $Na_2CO_3$ (by reaction with CaO to form NaOH, using technology routinely practiced in the pulping industry, i.e., recausticizer technology). Illustrative reactions for formation of these products are:

$$S+2Na \text{---} >Na_2S \quad (7)$$

$$2Na+2CO \text{---} >Na_2O_2+2C \quad (7A)$$

$$2Na+3CO \text{---} >Na_2CO_3+2C \quad (8)$$

Experiments have found that $Na_2CO_3$ and elemental Na, respectively accounted for 18% and 24% of the sodium in the DBLC. It is recognized that elemental Na is a facile pulping chemical precursor because it can be readily converted to NaOH by reacting it with water yielding $H_2$ as a valuable co-product:

$$2Na+2H_2O \text{---} >2NaOH+H_2 \quad (9)$$

Reaction (9) can also occur in the main treatment furnace between sodium liberated by the process and water derived from moisture in the pulping residues.

An exemplary process chemistry for the production of ethylene from biomass via metal carbides is illustrated below. In one preferred embodiment of the present invention, ethylene is produced from biomass by means of the following sequence of process steps: (i) conversion of the biomass to calcium carbide (see, for example, Reactions (1), (2), (5) and (6) or other metal carbide by reacting the biomass with calcium oxide or other suitable metal oxide; (ii) conversion of the calcium carbide (or other metal carbide) to acetylene by reaction of the carbide with water (see, for example, Reaction (3)); and then (iii) production of ethylene by hydrogenation of the acetylene.

$$C_2H_2 \text{ (acetylene)}+H_2 \text{---} >C_2H_4 \text{ (ethylene)} \quad (9A)$$

where the hydrogen ($H_2$) also can be obtained by conversion of the biomass according to the methods of the present invention (see, for example, see Reactions (1), (2), (5)), or by gasification, or by other means of conversion of biomass or fossil fuels such as natural gas, or by any means convenient.

Reaction (9A) can be operated at elevated pressures (i.e., >1 atm up to as much as 100 atm or more) of $H_2$, $C_2H_2$, or both, and a suitable hydrogenation catalyst can be used.

An alternative exemplary process chemistry for the conversion of waste pulping liquors to valuable products with recovery of pulping chemicals is illustrated below. This method provides indirect production of pulping chemicals via carbide intermediates. This embodiment of the invention particularly relates to cases where sodium is present in the biomass feed and calcium oxide is not present in any substantial amounts, focusing in particular on pulping residues. The sodium is converted in the thermal treatment (plasma) furnace primarily to sodium carbide or sodium bicarbide (or both products).

An exemplary process for providing recycle sodium hydroxide from waste pulping liquor and, at the same time, generating high value products, i.e., molecular hydrogen, carbon monoxide, and acetylene or other hydrocarbon fuels and/or chemical feedstocks is illustrated below. It is illustrated here by a reaction with lignin in the pulping residue, but it is recognized that other organic materials in the residue or exogenously added also can be used.

$$6NaOH_{(in\ waste)} + 4C_5H_6O_2 \dashrightarrow 3Na_2C_2 + 14CO + 15H_2 \quad (10)$$

$$Na_2C_2 + 2H_2O \dashrightarrow 2NaOH_{(separated\ from\ waste)} + C_2H_2 \quad (11)$$

$$NaOH_{(in\ waste)} + C_5H_6O_2 \dashrightarrow NaHC_2 + 3CO + 3H_2 \quad (12)$$

$$NaHC_2 + H_2O \dashrightarrow NaOH_{(separated\ from\ waste)} + C_2H_2 \quad (13)$$

where Reactions (10) and (12) occur within the high temperature residue-treatment reactor, and reactions (11) and (13) are performed outside that reactor at lower temperature after separation of the $Na_2C_2$ and $NaHC_2$ as solids.

An exemplary process for providing recycle sodium sulfide from waste pulping liquor and, at the same time, generating high value products, i.e., molecular hydrogen, carbon monoxide, and acetylene or other hydrocarbon fuels and/or chemical feedstocks is illustrated below. As above, it is illustrated here by a reaction with lignin in the pulping residue, but it is recognized that other organic materials in the residue or exogenously added also can be used.

$$3Na_2S_{(in\ waste)} + 2C_5H_6O_2 \dashrightarrow 3Na_2C_2 + 3H_2S + 4CO + 3H_2 \quad (14)$$

$$Na_2C_2 + H_2S \dashrightarrow Na_2S_{(separated\ from\ waste)} + C_2H_2 \quad (15)$$

$$3Na_2S_{(in\ waste)} + 4C_5H_6O_2 \dashrightarrow 6NaHC_2 + 3H_2S + 8CO + 6H_2 \quad (16)$$

$$2NaHC_2 + H_2S \dashrightarrow Na_2S_{(separated\ from\ waste)} + 2C_2H_2 \quad (17)$$

An exemplary process for providing recycle sulfites from waste pulping liquor and, at the same time, generating high value products, i.e., molecular hydrogen, carbon monoxide, and acetylene or other hydrocarbon fuels and/or chemical feedstocks is illustrated below. As above, it is illustrated here by a reaction with lignin in the pulping residue, but it is recognized that other organic materials in the residue or exogenously added also can be used.

$$Na_2SO_3\ _{(in\ waste)} + C_5H_6O_2 \dashrightarrow Na_2C_2 + SO_2 + 3CO + 3H_2 \quad (18)$$

$$SO_2 + H_2O \dashrightarrow H_2SO_3 \quad (19)$$

$$Na_2C_2 + H_2SO_3 \dashrightarrow Na_2SO_3\ _{(separated\ from\ waste)} + C_2H_2 \quad (20)$$

$$3Na_2SO_3\ _{(in\ waste)} + 5C_5H_6O_2 \dashrightarrow 6NaHC_2 + 3SO_2 + 13CO + 12H_2 \quad (21)$$

$$SO_2 + H_2O \dashrightarrow H_2SO_3 \quad (19)$$

$$2NaHC_2 + H_2SO_3 \dashrightarrow Na_2SO_3\ _{(separated\ from\ waste)} + 2C_2H_2 \quad (22)$$

$$CaSO_3\ _{(in\ waste)} + C_5H_6O_2 \dashrightarrow CaC_2 + SO_2 + 3CO + 3H_2 \quad (23)$$

$$SO_2 + H_2O \dashrightarrow H_2SO_3 \quad (19)$$

$$CaC_2 + H_2SO_3 \dashrightarrow CaSO_3\ _{(separated\ from\ waste)} + C_2H_2 \quad (24)$$

An exemplary process for providing recycle bisulfites from waste pulping liquor and, at the same time, generating high value products, i.e., molecular hydrogen, carbon monoxide, and acetylene or other hydrocarbon fuels and/or chemical feedstocks is illustrated below. As above, it is illustrated here by a reaction with lignin in the pulping residue, but it is recognized that other organic materials in the residue or exogenously added also can be used.

$$6NaHSO_3\ _{(in\ waste)} + 4C_5H_6O_2 \dashrightarrow 3Na_2C_2 + 6SO_2 + 14CO + 15H_2 \quad (25)$$

$$SO_2 + H_2O \dashrightarrow H_2SO_3 \quad (19)$$

$$Na_2C_2 + 2H_2SO_3 \dashrightarrow 2NaHSO_3\ _{(separated\ from\ waste)} + C_2H_2 \quad (26)$$

$$NaHSO_3\ _{(in\ waste)} + C_5H_6O_2 \dashrightarrow NaHC_2 + SO_2 + 3CO + 3H_2 \quad (27)$$

$$SO_2 + H_2O \dashrightarrow H_2SO_3 \quad (19)$$

$$NaHC_2 + H_2SO_3 \dashrightarrow NaHSO_3\ _{(separated\ from\ waste)} + C_2H_2 \quad (28)$$

$$3Ca(HSO_3)_2\ _{(in\ waste)} + 4C_5H_6O_2 \dashrightarrow 3CaC_2 + 6SO_2 + 14CO + 15H_2 \quad (29)$$

$$SO_2 + H_2O \dashrightarrow H_2SO_3 \quad (19)$$

$$CaC_2 + 2H_2SO_3 \dashrightarrow Ca(HSO_3)_2\ _{(separated\ from\ waste)} + C_2H_2 \quad (30)$$

The process chemistry can be manipulated to favor bisulfite or sulfite production by manipulation of the molar ratio of sulfurous acid to metal carbide, i.e., this ratio is adjusted to 2 to favor Reactions (26) and (30), the ratio is adjusted to 1 to favor Reactions (20), (24), and (28), and the ratio is adjusted to 0.5 to favor Reaction (22).

An exemplary process for the regenerating $Na_2S$ from makeup $Na_2SO_4$ (saltcake) with the production of acetylene by-product is illustrated below.

$$Na_2SO_4\ _{(added\ to\ waste)} + 2C_5H_6O_2 \dashrightarrow Na_2C_2 + H_2S + 8CO + 5H_2 \quad (31)$$

$$Na_2C_2 + H_2S \dashrightarrow Na_2S_{(separated\ from\ waste)} + C_2H_2 \quad (15)$$

$$3Na_2SO_4\ _{(added\ to\ waste)} + 8C_5H_6O_2 \dashrightarrow 6NaHC_2 + 3H_2S + 28CO + 18H_2 \quad (32)$$

$$2NaHC_2 + H_2S \dashrightarrow Na_2S_{(separated\ from\ waste)} + 2C_2H_2 \quad (17)$$

A process for management of organo-sulfur compounds is illustrated below. Here, the process is illustrated using mercaptans and CaO. However, it is recognized that analogous reactions occur with organic sulfides and disulfides, and for other metal oxides.

$$R-CH_2-CH_2-SH \dashrightarrow R-CH=CH_2 + H_2S \quad (33)$$

$$H_2S + CaO \dashrightarrow CaS + H_2O \quad (34)$$

An exemplary process for generating sodium sulfite by recycling sodium sulfide is illustrated below.

$$3Na_2S_{(in\ water)} + 2C_5H_6O_2 \text{---} > 3Na_2C_2 + 3H_2S + 4CO + 3H_2 \quad (14)$$

$$2H_2S + 3O_2 \text{---} > 2H_2SO_3 \quad (35)$$

$$Na_2C_2 + H_2SO_3 \text{---} > Na_2SO_{3\ (separated\ from\ waste)} + C_2H_2 \quad (20)$$

$$3Na_2S_{(in\ waste)} + 4C_5H_6O_2 \text{---} > 6NaHC_2 + 3H_2S + 8CO + 6H_2 \quad (16)$$

$$2H_2S + 3O_2 \text{---} > 2H_2SO_3 \quad (35)$$

$$2NaHC_2 + H_2SO_3 \text{---} > Na_2SO_{3\ (separated\ from\ waste)} + 2C_2H_2 \quad (22)$$

By the methods of this invention, biomass in general including pulping residues is converted to valuable products, i.e., acetylene or ethylene (or other valuable hydrocarbon fuels and chemical feedstocks), CO, and $H_2$. Further, for the case of pulping residues, pulping chemicals are regenerated. For biomass containing inorganic matter, metals and useful metallic salts can be generated. Commercialization of this approach can result in multiple technical, economic, and environmental benefits: (1) more valuable products from lignin and other organic residues of pulping; (2) ability to upgrade organic residues and regenerate pulping chemicals in an integrated, synergistic process; (3) major downsizing and possibly total elimination of the high capital cost, and not totally accident free waste liquor recovery boilers currently used to burn organic residues and initiate pulping chemicals recovery; (4) ability to generate and recycle sodium sulfite ($Na_2(SO_3)_2$), which is now of interest for innovative chemical pulping technologies; (5) ability to recycle $Ca(HSO_3)_2$, which historically has been unrecoverable from sulfite pulping technologies; (6) deodorization of mercaptans and other sulfur compounds; (7) a process for converting all forms of biomass, including but not limited to, wood, wood wastes, energy crops, municipal solid waste, etc. to metal carbides, acetylene, ethylene, other hydrocarbon fuels and chemical feedstocks, and $H_2$, and CO.

In the process of the present invention the biomass is prepared as a powder or granular material preferably having an average particle size of about 2-3 mm. or less, more preferably about 1 mm. or less. Typically, less then 15 wt % of the particles are greater than about 1 cm in average size; preferably less than 5 wt % are greater than about 1 cm in average size. In some embodiments, depending upon the particular equipment used, it may be preferred to use even smaller particle size distribution, e.g., 85 wt % or more of the particles having an average size of about 0.2 mm. or less. As used herein, the term "average size" means the particle size diameter or equivalent diameter of the particle.

Materials added to the biomass feed preferably will have a similar particle size. The biomass material typically is mixed with a metal oxide such as CaO, MgO, or the like, entrained in a carrier gas, typically argon or hydrogen, and fed into the reaction chamber. In the chamber, the mixture is rapidly heated to a temperature sufficiently high that the process chemical reactions occur, forming the metal carbide and one or more valuable gaseous co-products, such as carbon monoxide (CO) and molecular hydrogen ($H_2$). A temperature of at least about 1400° C. is required. Reaction products are quenched and then transferred to a products separation chamber, which separates elemental solids from the product stream.

The feed materials preferably are fed into a premixing chamber first, which can be a dense phase fluidized bed, a transfer line, an entrainment tube, or other suitable gas-solids mixing apparatus, which are well known to those skilled in the art. Preferably, the premixing chamber is heated, particularly when the biomass is a liquid waste and preconcentration and/or drying is desired. The metal oxide typically is added after drying the biomass material to avoid formation of a hydroxide, which is not desirable in the feed stream. The premixer is typically operated at a temperature low enough to prevent appreciable unwanted chemical reactions of the feed materials, generally less than 650° C., preferably at a temperature of 250° C. or less, and more preferably 125° C. or less. The feed mixture then is conveyed from the premixer to a main reactor chamber. The temperature in the reaction chamber should be at least 1400° C., preferably at least 1800° C., and can be much higher (2000° C. or more), particularly if certain means of feed heating, such as a thermal plasma, are employed.

The pressures in the premixer, the main reactor chamber, the effluent and transfer lines, and the separation chamber, are typically maintained above the prevailing atmospheric pressure to prevent leakage of atmospheric air into the process equipment. The pressures can be different in these regions and generally will be at least a few inches of water above the atmospheric pressure. For certain embodiments, the pressure can be as high as several tens of atmospheres for the most efficient operation of the equipment.

The cooling of the reaction products and unconverted feed can be accomplished by any of a number of means well known to those skilled in the art. Such means of cooling include, for example: (i) extraction of heat from the immediate environs of the products, i.e., by transfer of heat through the walls of the reaction chamber 4; or (ii) introduction of appropriate "quenching agents" (to which reference may be made herein as "Q") or "quenching/recovery agents" (to which reference may be made herein as "Q-R"), or both Q and Q-R. In the case of using quenching agents, heat is extracted from the reaction products by transfer of the heat to the quenching agent by physical means, or by virtue of a phase change or by endothermic chemical reaction involving one or more ingredients in the quenching agent, or by any combination of these means. The quenching/recovery agents also can extract heat from the reaction products by any of the means noted. However, the quenching/recovery agents also can serve to help redeploy the reaction products to a form more suited to separation, storage, or recovery, e.g., by operations carried out in a separation chamber, or to a form more suited for purification or a specific utilization.

The quenching agents or quenching/recovery agents can be introduced to the stream of reaction products at a location within the main reactor chamber, i.e., by means of an injector plenum, which is already positioned in or, as desired, which can be brought into communication with the products. The location(s) for injection of the Q or Q-R agents are selected to help achieve high levels of the desired product and, further, to avoid or reduce to acceptable levels, the generation of undesired by-products.

Examples of quenching—Q—agents suitable for the practice of the present invention include non-reactive solid particles (e.g., refractory ceramic particles), liquid droplets, vapors and gases, or mixtures thereof. Properties of the solid particles that can be selected to enhance separation of the product are particle size distribution, shape (e.g., spherical or rod-like, etc.), internal surface area, total surface area, pore size distribution, surface texture, morphology, and the like, etc. Liquid droplets can also be varied in size distribution to enhance product collection. Further, such agents can be capable of undergoing endothermic changes of state by physical or chemical means (e.g., melting, evaporating, subliming, change of crystal form, etc.) at temperatures suitable for quenching elemental sodium, calcium carbide, or other desired products of the process. When water is used as the quenching agent, the metal carbide is hydrolyzed to produce a hydrocarbon gas product.

Examples of quenching/recovery—Q-R—agents suitable for the practice of the present invention also include solid particles, liquid droplets, gases, vapors, and mixtures thereof, from which the desired products can be readily separated. Q-R agents are typically selected because they exhibit one or more of the chemical or physical attributes listed above with respect to Q agents. However, it will be recognized by those skilled in the art that specific properties can receive greater or lesser emphasis for Q-R agents than they do for Q agents. However, although Q and Q-R agents can be similar materials, Q-R agents are selected to enhance recovery and can bind or carry the desired products such that they can be readily extracted. As such, Q-R agents can increase product recovery, product purity, etc.

Separation methodologies can include any techniques common in the separation of gases and vapors from solids, e.g., cyclones, centripeters, staged cascade impactors, etc. However, as noted above, recovery agents can be utilized to capture and retain elemental sodium, calcium carbide, or other desired products. These agents can be gases, vapors, liquids, or solids of particular chemical composition and, in the case of liquids, having a selected droplet size distribution, and in the case of solids, having a selected particle size distribution, total surface area, internal surface area, shape, pore size distribution, surface texture and morphology, as desired for particular equipment and operating conditions.

Preferably, the feed stream is rapidly heated to a desired temperature. Rapid heating of the feed stream can be accomplished by a variety of methods well known to those skilled in the art. In a preferred embodiment of the invention, an electrical arc discharge is struck between a cathode (negative) and an anode (positive) to heat the feed stream to the desired reaction temperature.

Equipment for operating the process can be structured and arranged as a series of interconnected fluidized bed or entrained bed vessels that separately, or in suitable combinations, fulfill the functions described above for the premixing chamber, the main reactor chamber, and the products separation chamber.

Figure 2:
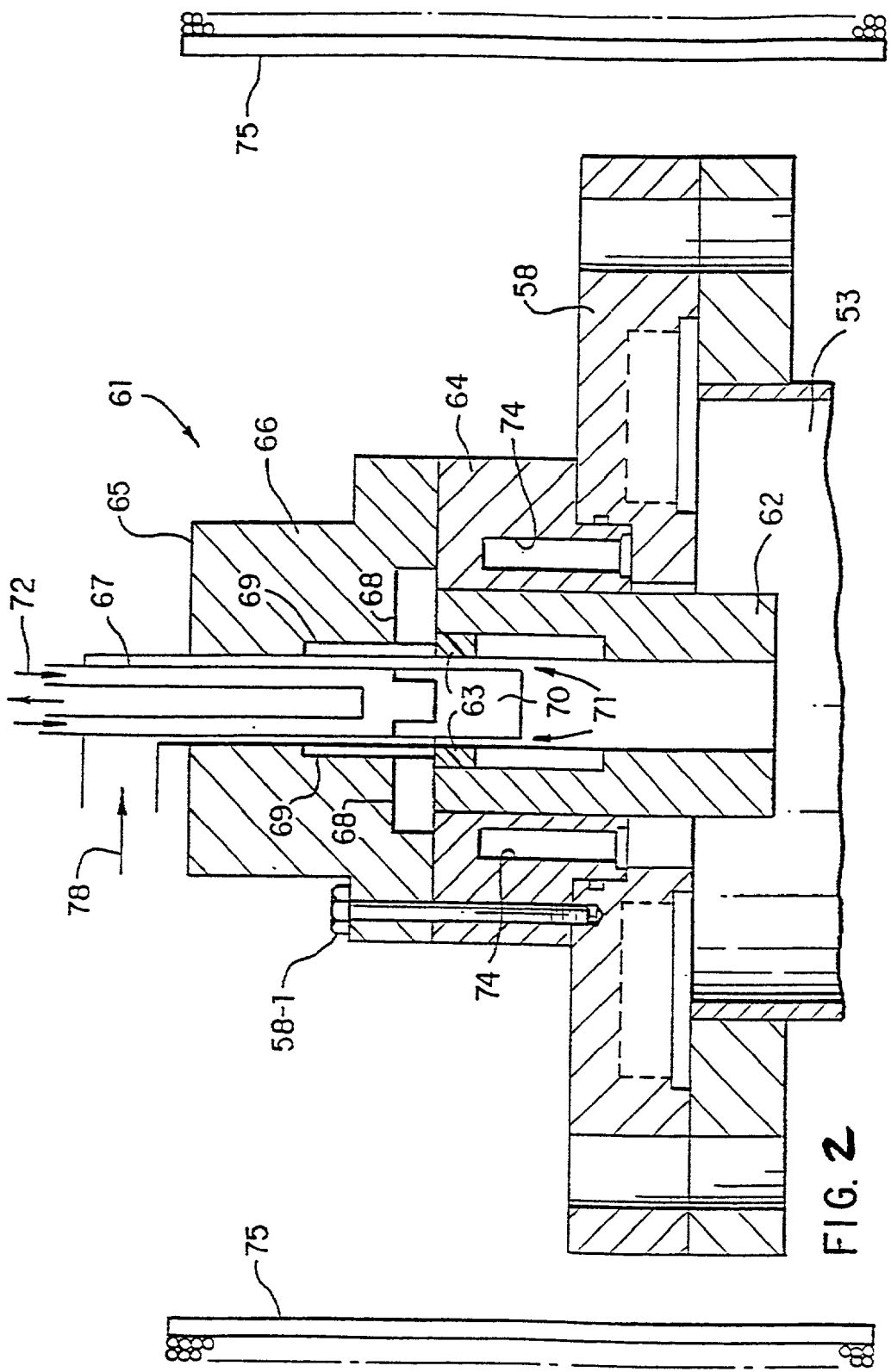
FIG. 2 is a schematic illustration of a plasma reactor useful in connection with the equipment illustrated in FIG. 1 to conduct the process of the present invention.
Figure 3:
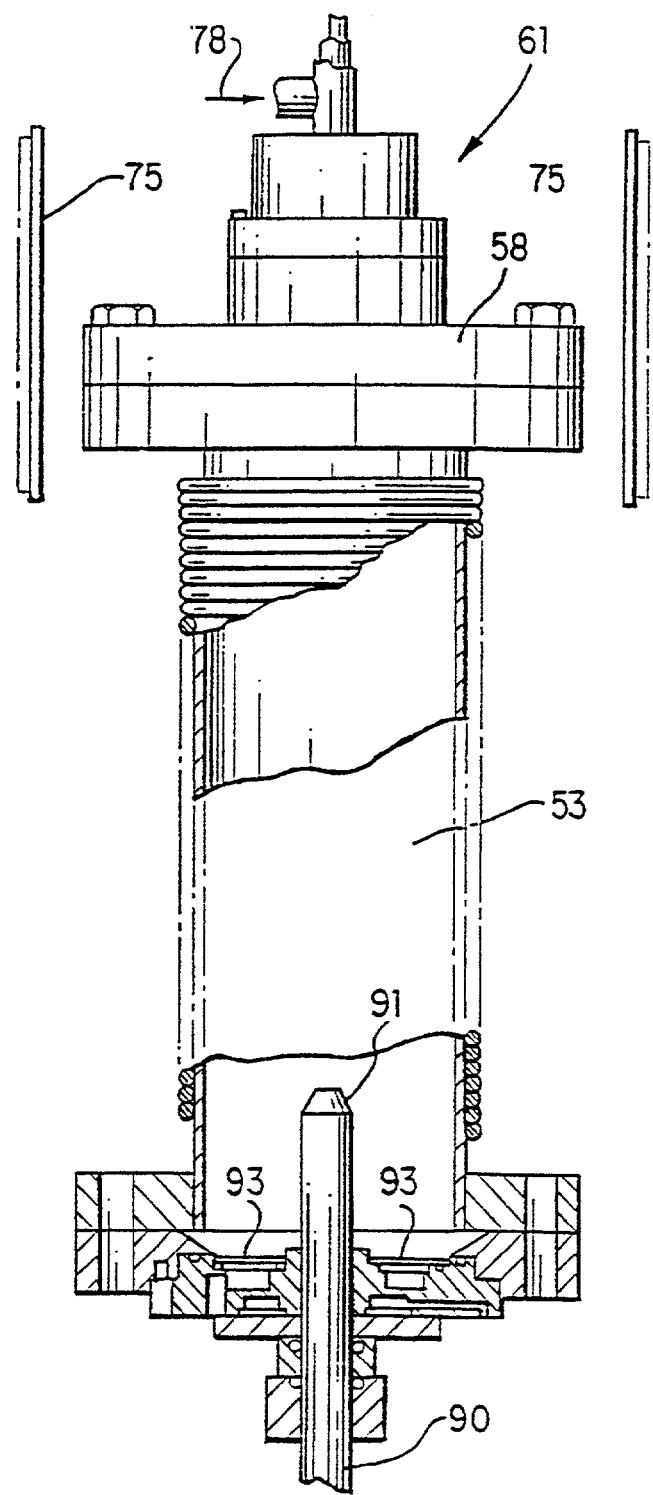
FIG. 3 is a schematic illustration of the plasma reactor, cooling chamber and a collection probe for withdrawing samples from the reactor.

The process of the present invention was run on experimental apparatus substantially as illustrated in FIGS. 1 to 3. The experimental apparatus 50 consists of a plasma reactor 61 containing a plasma generator system, a powder feeder 52, a post reactor cooling chamber 53 for thermally quenching the reactor effluent, and a sample collection system 54, 93, etc. The plasma generator system consists of an arc discharge d.c. plasma torch providing the plasma reactor, a high frequency oscillator 76 (for initiating the arc), a control console and an AIRCO d.c. power supply unit 77 rated by the manufacturer at up to 83 kilowatts ("kW") and capable of providing open circuit output voltages of 80, 160 and 320 volts ("V").

The plasma reactor 61 as originally constructed is illustrated in further detail in FIG. 2. It was made of a 0.75 inch O.D. graphite cathode and a 1 inch I.D. graphite anode. The anode 62 was held by pipe threads in a water cooled brass anode holder 64, which is mounted on the top flange 58 of the cooling chamber 53. A cooling channel 74 is provided in the anode holder 64. The upper portion of the graphite anode was electrically insulated by a ring 63 made from boron nitride.

The cathode assembly 65 included a nylon part 66 that provides a support for the water cooled copper section 67 forming the upper part of the cathode (cooling water was supplied through concentric tubes 72). The nylon part 66 also electrically insulated the cathode from the anode and was secured to the anode holder and to the top flange 58 of the cooling chamber 53 by three screws (one shown at 58-1). A low density alumina ring 68 was used to thermally insulate the nylon support 66 from the anode 62. A high density alumina tube 69 thermally insulated the nylon support from arc radiation. The cathode tip 70 was made of a 1.5 inch long piece of 0.75 inch graphite rod, which was drilled and tapped to be attached to the copper section of the cathode. An annular opening 71 was formed between the anode and cathode, through which gas and other feed materials were fed into the reactor.

In accord with practices well known to those skilled in the art, a solenoid 75 was used to apply a magnetic field perpendicular to the arc current, which induces in the charged particles a velocity component perpendicular to their original direction of travel. Consequently, the path of charged particles moving in a plane perpendicular to the magnetic field will curve. However, the mean free path of the particles remains practically unaltered. Under these conditions, the electrical conductivity of the plasma is more anisotropic resulting in a better confined plasma.

Powder was fed with argon as the carrier gas to the reactor gas inlet 78 using a Miller Thermal, Inc. Model 1270 mechanical wheel-type powder-feeder 52. The plasma reactor was mounted on the top of a steel, post reactor cooling chamber 53, which has a water cooled wall for cooling of the reactor effluent and rapid quenching to recover solid and gaseous reaction products. The gaseous products were aspirated from the cooling chamber 53 with two vacuum pumps 80,81 (i) through a sintered disc 93 at the bottom of the chamber and a filter train 85 downstream of the chamber into a ventilation stack 86 and (ii) through the probe 90, as described further below.

Part of the product quenching and collection system consisted of a movable, water cooled and gas quenched collection probe 90 that is mounted at the bottom of the cooling chamber 53. The probe was designed so that the distance of separation between the tip of the plasma "flame" and the entrance 91 to the probe can be adjusted. Solid reaction products were collected for further examination on a sintered stainless steel filter cup 54 located downstream of the probe. In addition, solid reaction products were collected on the sintered disc 93 at the bottom and on the walls of the cooling chamber 53. Gas samples were collected in a sampling bulb 91 using a sampling pump 92.

Other lines illustrated in FIG. 1 are the main gas line 100 to the plasma reactor, the start gas line 101 to the plasma reactor, the powder carrier gas lines 102,103, the probe radial gas line 104, and the probe quench gas line 105. A pressure controller is shown at 110. Dilution nitrogen gas can be added at 115.

A typical operating procedure was as follows. An argon plasma was first established to operate the plasma reactor. Feeding of the biomass and metal oxide powder was started. The powder (at the desired feed rate) was entrained in argon or other suitable carrier gas (at ambient temperature) and introduced into the plasma.

FIG. 3 illustrates the plasma reactor 61 on top of cooling chamber 53. Collection probe 90 is mounted at the bottom of the cooling chamber. The distance between the tip of the plasma flame (not illustrated) and the probe 90 can be adjusted by locating the tip 91 of the probe at the desired position in the cooling chamber.

The invention will be demonstrated further by the examples that follow. The examples are presented merely as illustrations and do not limit the scope of the present invention. Unless otherwise specified in the examples, the percents are weight percents.

EXAMPLES IP-1-IP-5

In Examples IP-1-IP-5, powdered lignin with powdered CaO were premixed in a known and pre-selected molar ratio. This feed material was delivered at a controlled mass rate from a wheel feeder to a carrier gas (typically argon) in which it becomes entrained. The resulting lignin/CaO/Ar mixture was conveyed into a non transferred arc (thermal plasma flame) established between a graphite cathode and a graphite anode at approximately 1 atm total pressure (FIG. 2). Argon, plus products and unconverted reactants, if any, exit the plasma region and enter a cooling chamber where they are collected on filters or sampled into a movable probe for further filtering of solids and quantification of gas flows, gas composition and products yields (FIGS. 1 and 3).

Carbides were assayed by hydrolysis of solids recovered from the reactor, using water or dilute aqueous acids as appropriate, followed by gas chromatographic quantitation of the evolved gases. Assuming that $CaC_2$ undergoes hydrolysis according to Equation (3) above, and that the only source of acetylene is $CaC_2$, then the acetylene yield upon water treatment of product solids furnishes the $CaC_2$ yield. In some cases where acetylene was already found in the headspace of the flask containing the solids before hydrolysis, to obtain the carbide yield, the amount of acetylene measured after hydrolysis was corrected by subtracting the amount of acetylene present before hydrolysis.

Reagents
1. Lignin
   Aldrich # 37,095-9, alkali (Kraft)
   Appearance: brown powder
   50.87%, H: 5.30%, N: 0.07%
   Loss on ignition (750° C.): 88 wt %
   Moisture (105° C.): 11 wt % (<106 μm size fraction of as received material)

For all experiments the lignin was dry sieved to <106 μm using an ASTM screen (150 mesh). The coarse fraction was made up of particles with different morphologies. The major fraction of the coarse resembled the fine fraction. Some smaller black, shiny particles and some big, char-like particles were also found in the coarse fraction. The ash from the loss on ignition determination is very different for the fines and the coarse. Although the coarse yield a black residue, the fines form an ash composed of a whitish area, clearly separated from a blue residue. The composition of this ash has not been determined. It apparently is formed by some oxides of elements commonly found in wood: Ca, K, Na, Mg, Si, P. The blue fraction resembles $CuSO_4.5H_2O$, but it is unlikely that the water of crystallization would be retained by heating to 750° C. because $CuSO_4.5H_2O$ gives off its fifth mole of water at 250° C. Other compounds that are blue and might be formed are: $Co_2(SO_4)_3$ and $CoCl_2$.

Using the elemental analysis and moisture and ignition loss measurements, the following chemical composition was derived for the lignin:
   Moisture: 11%, ash: 12%, organic matter: 77% (100%-ash-moisture)
   C: 50.87%, H: 5.3%, N: 0.07%, O: 20.76% (by difference based on organic matter)
   Empirical formulas: $C_5H_6O_{1.53}$ or $C_{6.53}H_{8.10}O_2$ or $C_{10}H_{12}O_{3.06}$
2. Calcium Oxide (Quicklime)
   Runs IP-1 to IP-3: EM Science # CX0265-3, no analysis available
   Runs IP-4 and IP-5: Aldrich # 20,815-9
   Appearance: white powder
   Purity: 99.9%
   Titration: 96.0% (with NaOH)
   Trace analysis: Sr 230 ppm, Si 25 ppm, Mg 10 ppm, Ba 8 ppm, Al 4 ppm, Cu 3 ppm, Mn/Ni 1 ppm
   Loss on ignition (750° C.): 2.5 wt % (<106 μm size fraction prepared by dry sieving as received material)

Run Conditions

C-to-Ca feed ratios were chosen assuming the following stoichiometry:

$$CaO + C_5H_6O_2 \rightarrow CaC_2 + 3H_2 + 3CO \qquad (36)$$

Lignin composition is expressed by the formula $C_5H_6O_2$. A stoichiometric mixture of lignin and CaO would contain 1 calcium atom per 5 atoms of carbon, i.e., C:Ca=5:1. For the Examples IP-1 to IP-3, an excess of lime of 10% was calculated without accounting for moisture in the lignin, i.e., 1.1 calcium atoms per 5 atoms of carbon (C:Ca=4.55:1). The actual C-to-Ca ratio turned out to be 4.0:1 because of the high moisture content of the lignin.

In Examples IP-4 and IP-5, a threefold excess of lime over the carbon in the lignin was calculated without accounting for moisture in the lignin, i.e., 3 Ca per 5 C, C:Ca=1.67:1. Due to the moisture content the true C-to-Ca ratio was 1.5:1.

For the runs IP-1 to IP-3, the fraction that passed an ASTM 150 mesh (106 μm) screen was used. Because sieving of the lignin and the CaO were performed manually, fractions significantly smaller than 106 μm were very time consuming to obtain. For the runs IP-4 and IP-5, CaO from a different supplier provided a sufficient amount of a fraction <63 μm.

In Example IP-1, hydrogen was used as the main gas. Excessive wear on the electrodes under the operating conditions required switching to argon as main gas for runs IP-2 to IP-5. Solid feed rates were lowered gradually from run to run to respond to a solids buildup in the interelectrode gap.

TABLE 2

| | Run Conditions | | | | |
|---|---|---|---|---|---|
| Example/Run # | IP-1 | IP-2 | IP-3 | IP-4 | IP-5 |
| CaO:lignin, wt %, as received | 33:67 | 33:67 | 33:67 | 57:43 | 57:43* |
| C:Ca molar ratio | 4.0 | 4.0 | 4.0 | 1.5 | 1.5* |
| Particle size CaO, μm | <106 | <106 | <106 | <63 | <63 |
| Particle size lignin, μm | <106 | <106 | <106 | <106 | <106 |
| Total solids feed rate, g/min | 13.4 | 7.4 | 7.4 | 5.1 | 5.1 |
| Main gas flow rate, L/min | 20 ($H_2$) | 20 (Ar) | 18 (Ar) | 25 (Ar) | 20 (Ar) |
| Arc power input, kW | ca. 15 | ca. 15 | ca. 15-18 | ca. 15-19 | ca. 15-19 |
| Comments | (1) | (2) | (3) | (4) | (5) |

(1) H2 as main gas
(2) Ar as main gas
(3) Aimed at higher arc power (≈30 kW)
(4) Higher Ca-to-C ratio; lower solids feed rate; higher gas feed rate
(5) Modified electrode configuration; attempt to dry solids
*Premixed CaO-lignin mixture was dried at 105° C. and stored over $P_2O_5$. $Ca(OH)_2$, presumably formed from the moisture in the lignin and the CaO, does not react back to CaO + $H_2O$ under these conditions.

Overview

Figure 4:
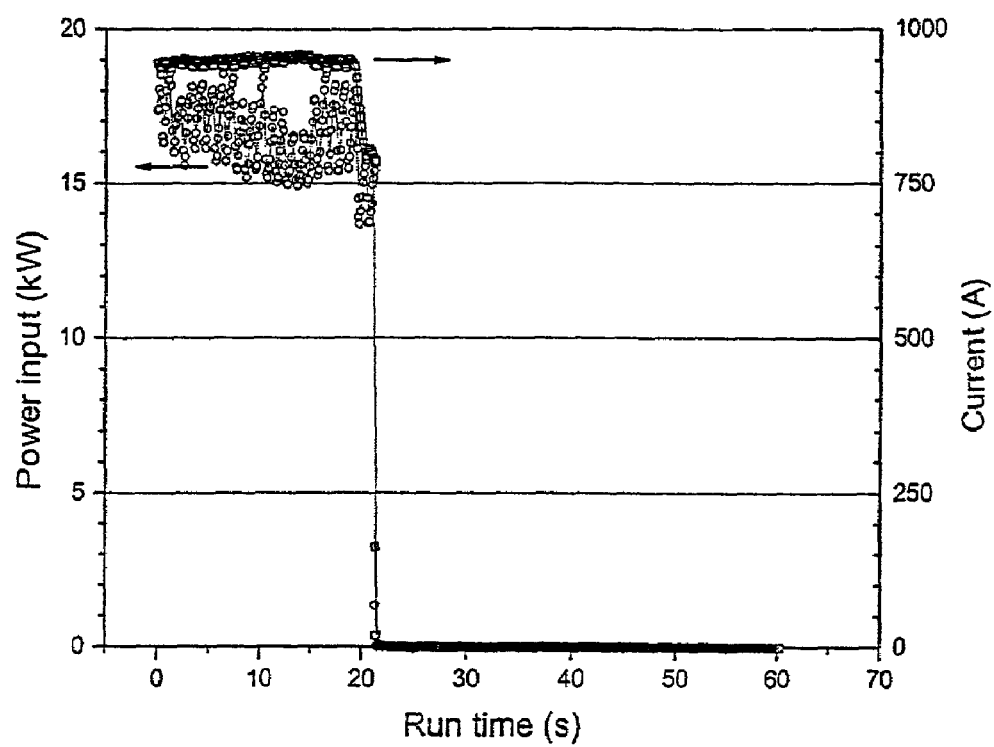
FIG. 4 is a graph illustrating Arc power (○) and arc current (□) for an experiment run in accord with the present invention using lignin and calcium oxide as feed materials.
Figure 5:
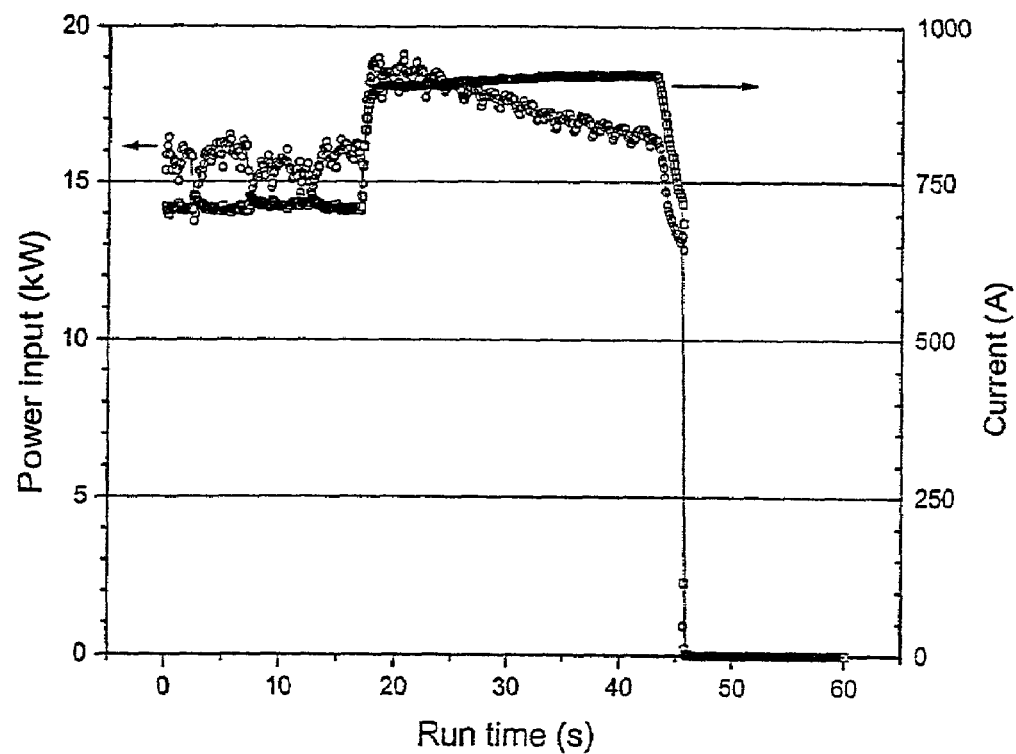
FIG. 5 is a graph illustrating Arc power (○) and arc current (□) for another experiment run in accord with the present invention using lignin and calcium oxide as feed materials.

Arc power (o) and arc current (○) for run # IP-3 are illustrated in FIG. 4. Arc power (o) and arc current (○) for run # IP-4 are illustrated in FIG. 5. The continuous lines in the figures represent adjacent averaging of 5 data points.

Using hydrogen as the main arc gas (Run IP-1) lead to a severe degradation of the electrodes (Table 3). The weight loss on the cathode tip was 11%, while the anode insert lost 14% of its weight. Weight loss of the electrodes produces unsteady run conditions due to a change of surface area giving rise to a changing current density and flow geometry, and provides an additional source of carbon which must either be marginalized or accounted for quantitatively in order to distinguish between lignin and electrode contributions to carbon in the products.

With argon as main gas, wear on the electrodes was greatly reduced (Table 3). Nevertheless the remaining weight loss of up to 0.75 g is still a significant carbon source, of the same order of magnitude as the total carbon fed as lignin in some runs, e.g. IP-3 and IP-4.

TABLE 3

Electrode weight losses (n.d. = not determined)

| Example/Run # | IP-1 | IP-2 | IP-3 | IP-4 | IP-5 |
|---|---|---|---|---|---|
| Cathode loss, wt % | 11.4 | 1.1 | 1.4 | 1.3 | 0.3 |
| Anode loss, wt % | 14.2 | 0.2 | 1.5 | 0.7 | ** |
| Total loss, g | 7.12 | 0.23 | 0.75 | 0.59 | n.d. |
| Total loss, moles C | 0.59 | 0.02 | 0.06 | 0.05 | n.d. |
| Moles lignin-C fed* | 0.29 | 0.16 | 0.16 | 0.07 | 0.07 |

*Basis: corrected to 60 s run time.
**The anode insert was fused to the anode holder and could not be recovered for weighing.

The Kraft lignin used in the experiments (Aldrich # 37,095-9) was found to contain 11 wt % moisture. Upon mixing with the CaO some $Ca(OH)_2$ may have formed. Thus the solids feed consisted of lignin, CaO, and $Ca(OH)_2$. The water bound in the calcium hydroxide is liberated at temperatures above 580° C. This water is suspected to interfere with other species formed before, in, or after the plasma zone. Table 4 lists the solids feed composition based on the conversion of CaO to $Ca(OH)_2$ because of the reaction of the lignin moisture with the lime.

TABLE 4

Actual feed composition and carbon-to-calcium molar ratios.

| Example/Run # | IP-1 | IP-2 | IP-3 | IP-4 | IP-5 |
|---|---|---|---|---|---|
| CaO:lignin, wt %, as received | 33:67 | 33:67 | 33:67 | 57:43 | 57:43 |
| Lignin, wt %, dry | 60 | 60 | 60 | 38 | 38 |
| CaO, wt % | 10 | 10 | 10 | 42 | 42 |
| $Ca(OH)_2$, wt % | 30 | 30 | 30 | 20 | 20 |
| Residual water, wt % | 0 | 0 | 0 | 0 | 0 |
| Targeted C:Ca, molar ratio | 4.55 | 4.55 | 4.55 | 1.67 | 1.67 |
| Actual C:Ca, molar ratio | 4.0 | 4.0 | 4.0 | 1.5 | 1.5 |

Preferably, for the apparatus used, the lignin should be dried to <1 wt % moisture before mixing with the CaO to avoid forming $Ca(OH)_2$ and thus introducing water into the arc zone.

EXAMPLES IP-6-IP-12

Additional experiments were run using conditions as set forth in Examples IP-1 to IP-5, except that dry lignin or DBLC (i.e., "DBLP char") was used and the operating parameters were set as listed below in Tables 5 and 6.

TABLE 5

Run conditions for runs IP-6 to IP-9.

| Example/Run # | IP-6 | IP-7 | IP-8 | IP-9 |
|---|---|---|---|---|
| CaO: lignin, wt %, dried | 59:41 | 59:41 | 59:41 | 100:0 |
| C: Ca molar ratio | 1.67 | 1.67 | 1.67 | 0 |
| Particle size CaO, μm | <63 | <63 | <63 | <106 |
| Particle size lignin, μm | <106 | <106 | <106 | <106 |
| Total solids feed rate, g/min | ca. 13 | ca. 13 | ca. 13 | n.d.* |
| Main gas flow rate, L/min | 25 (Ar) | 35 (Ar) | 35 (Ar) | 20 (Ar) |
| Arc power input, kW | ca.15-17 | 16-20 | ca.11-13 | ca.12-14 |
| Cathode weight change, % | −0.54 | −15.8 | −1.58 | −0.4 |
| Anode weight change, % | +2.2 | −1.1 | −0.21 | +0.02 |

*not determined, because no calibration of the wheel feeder with pure CaO was made.

TABLE 6

Operating Conditions For Plasma Furnace Reactions of Premixed DBLP Pyrolysis Char-Calcium Oxide Powders.

| | Example/Run No. | | |
|---|---|---|---|
| | IP-10 | IP-11 | IP-12 |
| CaO: char, wt % | 27:73 | 27:73 | 27:73 |
| C:Ca molar ratio | 4.55 | 4.55 | 4.55 |
| Particle Size CaO, μm | <106 | <106 | <106 |
| Particle Size char, μm | <62 | <62 | <62 |
| Total solids feed rate, g/min | 14.4 | ca. 14 | ca. 14 |
| Main gas flow rate, L/min | 20 (Ar) | 20 (Ar) | 20 (Ar) |
| Arc power input kW | ? | 12-39 | 13-20 |
| Cathode weight change, % | −1.4 | −0.9 | −1.4 |
| Anode weight change, % | −0.4 | −1.0 | −0.4 |

For most of the duration of Runs IP-11 and IP-12, the arc power was <20 kW, and there was no qualitative or quantitative evidence of carbide formation in either experiment. In notable contrast, the arc power in Run IP10 shot up to 30 kW immediately after beginning solids feeding. Further, despite only 10 seconds of solids feeding time, product solids recovered from the bottom flange of the furnace cooling chamber exhibited intense reactivity in open air, consistent with that seen in other experiments known to produce copious amounts of metal carbides. Interestingly, however, solids recovered from the sampler cup in this same run showed no reactivity to water in off-line testing.

For the two DBLP-char runs showing no evidence of carbide formation, (IP-11, IP-12) insufficient specific enthalpy is indicated. Run IP-10, which exhibited strong qualitative indications of carbide formation despite its very short duration (10 sec.), also was characterized by a very large upswing in arc power (up to about 30 kW) immediately after feeding the solids had begun. Thus, this run provided sufficiently high specific enthalpy to effect DBLP-char conversion to carbides.

The reason for the higher arc power in Run IP-10 is thought to be the presence in the arc gas of light hydrocarbons and other volatiles released by pyrolysis of a small amount of unpyrolyzed lignin contaminant left over in the powder feeder from the earlier runs. Most of this impurity was apparently expelled from the feeder during Run IP-10. It is known that the use of non-inert gases as an arc gas allows the arc to assimilate additional power. This is because chemical bond breaking provides an additional sink for uptake of chemical enthalpy.

The absence of water reactivity in off-line experiments in solids recovered from the sampling for Run IP-10, despite the qualitative indications of carbide formation from the solids collected on the bottom flange of the cooling chamber, requires explanation. Because the arc only operated for 10 s after the solids feeding had begun, it appears that the solids in the sampling cup primarily or exclusively represent "product" solids sampled after the arc had shut down.

It has been proposed that the high reactivity of the flange solids immediately after exposure to air may reflect sodium reactions with $O_2$ or moisture. The presence of Na can be distinguished from the $Na_2C_2$ and $CaC_2$ carbide products of interest, by controlled hydrolysis—the metal giving $H_2$ as a product, both carbides giving $C_2H_2$. The main point is that strong reactivity was present in the flange solids from Run IP-10 which exhibited a high arc power, and strong reactivity was absent from the lower power runs IP-11 and IP-12.

EXAMPLES IP-13 to IP-20

A solids feed mixture was prepared by adding some unpyrolyzed but dried lignin (1-10 wt %) to the existing CaO+ pyrolyzed black liquor powder mixture. The lignin was added to facilitate increased arc power due to the volatiles it will release during heat up. The upper bound on the amount of lignin must be such that no plugging will occur. The lower bound is imposed by the desire to attain a certain arc power (i.e., 30-40 kW).

The specific objectives of these experiments were to react:
1) dried black liquor (DBL) with CaO to produce $CaC_2$ and synthesis gas, and
2) dried black liquor char (DBLC) and dried black liquor (DBL) with CaO to produce $CaC_2$ and synthesis gas on a laboratory scale using a thermal plasma furnace according to the global reaction equation:

$$CaO + 3C_{DBL,DBLC} = CaC_2 + CO \quad (37)$$

Preparation of Reactants

Two samples were provided by a paper manufacturing company: dried black liquor (DBL) and dried black liquor char (DBLC). The elemental compositions of the DBL and DBLC are shown in Table 7. The DBL and DBLC were reacted with exogenous CaO in the laboratory scale thermal plasma reactor FIGS. 1-3.

TABLE 7

Elemental compositions of the DBLC and DBL[a]

|  | DBL (w.f.) | DBLC (w.f.) |
|---|---|---|
| C | 34.73% | 33.73% |
| H | 3.21% | 0.86% |
| N | 0.051% | 0.02% |
| S | 5.13%, 5.13%[a] | 3.09%, 2.98%[a] |
| O | 33.55% | 30.04% |
| Na | 19.74%, 20.27%[a] | 27.21%, 27.09%[a] |
| Ca | 176.161 ppm | 223.223 ppm |
| sulfated ash | 61.4%, 61.4%[a] | 86.9% |
| organic | 63.7%, 63.7%[a] | 51.1% |
| inorganic | 36.3%, 36.3%[a] | 48.9% |
| O/I ratio | 1.76 | 1.04 |
| Formula | $Na_{0.87}C_{2.89}H_{3.21}S_{0.16}O_{2.1}$ | $Na_{1.18}C_{2.81}H_{0.86}S_{0.1}O_{1.88}$ |

[a]two determinations reported

The empiric formula based on the elemental analysis of the DBL is $Na_{0.87}C_{2.89}H_{3.21}S_{0.16}O_{2.1}$ and for the DBLC $Na_{1.18}C_{2.81}H_{0.86}S_{0.1}O_{1.88}$. However, the total carbon determined by elemental analysis in the DBL or DBLC is not available for carbide formation but an appreciable amount of the carbon will form by-products. Based on thermodynamic considerations, it appears that the oxygen in the DBL or DBLC will first consume some of the carbon to form CO, which is the most thermodynamically favorable species in the relevant temperature regime (1000-6000° C.). Furthermore, it appears that during CO formation, sodium, sulfur and hydrogen are converted to their stable element form:

$$Na_{1.18}C_{2.81}H_{0.86}S_{0.1}O_{1.88} = 1.18Na + 0.86/2H_2 + 0.1/8S_8 + 1.88\ CO + 0.93\ C_{CCC} \quad (38)$$

For the DBLC, this results in 0.93 mol "carbideable char carbon" (CCC). CCC is then available to react with CaO to form $CaC_2$:

$$0.93\ C_{CCC} + 0.93/3\ CaO = 0.93/3\ CaC_2 + 0.93/3\ CO \quad (39)$$

According to the stoichiometry of the above Reactions, 1 mole of CCC will produce ⅓ mole of $CaC_2$. In these experiments, instead of using ⅓ of 1 mole of CaO per mole of CCC, a 25% excess of CaO was used. This results in a mixture of 100 g DBLC and 21.7 g CaO. For other experiments with 50% DBL and 50% DBLC, a 25% excess of CaO over that needed to convert ⅔ of the $C_{CCC}$ to $CaC_2$ again was used.

Experimental Conditions

The feed material was delivered at a controlled mass rate from a wheel feeder to a carrier gas (typically argon) in which it becomes entrained. The suspended solids entrained in argon are added to the main gas. As main gas, hydrogen instead of argon was used in order to increase the arc power, substantially. The resulting DBLC/DBL/CaO/Ar/$H_2$ mixture was conveyed into a non transferred arc (thermal plasma flame) established between a graphite cathode and a graphite anode at approximately 1 atm total pressure. The effluent gas exited the plasma region and entered a cooling chamber where it was cleaned from condensed particulates by filters or sampled into a movable probe for further filtering of solids and quantification of gas flows, gas composition and products yields.

Table 8 summarizes the experimental conditions in runs IP-13 to IP-20. Using hydrogen as the main arc gas led to a severe degradation of the graphite electrodes, which might result in additional carbide formation. Therefore, a blank run IP13 was conducted where CaO without any black liquor material was introduced into the plasma and the background was measured.

In the runs IP-14 to IP-17 difficulties emerged in collecting a representative sample by quenching and sampling with the probe. Therefore, only the material which was recovered from the filters downstream of the reactor was analyzed. Unfortunately, these samples were exposed to air for a few minutes causing to some extent decomposition of possible carbides. By shutting off the quench gas in run IP18 and IP19, solids were collected by the probe in reasonable quantities for a subsequent analysis.

TABLE 8

Experimental conditions

| Example/Run # | IP-13 | IP-14 to IP-19 | IP-20* |
|---|---|---|---|
| CaO: DBLC: DBL, wt %, as received | 1:0:0 | 1:4.6:0 | 1:2.5:2.4 |
| C:Ca molar ratio | 0 | 7.25 | 7.87 |
| Particle size CaO, μm | 45-66 | 45-66 | 45-66 |
| Particle size DBL, DBLC, μm | 20-45 | 20-45 | 20-45 |
| Total solids feed rate, g/min | 4.7 | 10-13 | 12.7 |

TABLE 8-continued

Experimental conditions

| Example/Run # | IP-13 | IP-14 to IP-19 | IP-20* |
|---|---|---|---|
| Main gas flow rate, 1/min | 20 | 20 | 20 |
| Arc power input, kW | 27.3 | 18-27 | — |
| Specific enthalpy, kWh/kg CaO | 96.8 | 140-233 | — |

*Congestion of reactor orifice by DBL. Run IP-20 aborted

Product Analysis

The gaseous products and reactants were sampled during the run in a gas bulb and are analyzed quantitatively and identified by GC ("gas chromatograph"). The solid products and unconverted solid reactants were collected in a filter cup via a probe. The entrance to the probe was positioned approximately 4 inches below the anode. After each run, approximately 50 mg of the solid sample were transferred under argon atmosphere into a 50 ml flask and sealed with a septum stopper. Sequentially, 1 ml neon as internal standard and 5 ml of 2-M-HCl solution to initiate hydrolysis were injected into the flask. The head space gas above the solids after hydrolysis was analyzed by GC.

The protocol for quantification of yields of solid products was as follows: Calcium carbide, which was expected to be the only stable carbide formed, was assayed by hydrolysis with hydrochloric acid resulting in the evolution of acetylene:

$$CaC_2 + 2HCl_{(aq)} \rightarrow CaCl_{2(aq)} + C_2H_{2,(g)} \quad (40)$$

Sodium derived from the DBLC was assumed to form metal, which undergoes hydrolysis with release of hydrogen and sodium carbonate, which evolve $CO_2$ in hydrochloric acid:

$$Na + HCl_{(aq)} \rightarrow NaCl_{(aq)} + \tfrac{1}{2}H_{2,(g)} \quad (41)$$

$$Na_2CO_3 + 2\,HCl_{(aq)} \rightarrow 2NaCl_{(aq)} + CO_{2,(g)} + H_2O \quad (42)$$

After hydrolysis, the solution was filtered and the filtrate was analyzed by ICP ("inductively coupled plasma emission spectrum") to determine the total amounts of soluble Na and Ca. The amounts of gaseous species detected in the gas bulb and in the head space by GC analysis can be directly related to the yields of $CaC_2$, Na, and $Na_2CO_3$ produced in the plasma process.

The analytical procedure is limited in identification of all solid product species within the complex Na—Ca—C—O—H system. Therefore, in addition, one sample showing the highest yields was analyzed by x-ray diffraction (XRD) and x-ray photoelectron spectroscopy (XPS). XRD gives information on the molecular identity of crystalline substances while XPS can directly identify the chemical composition at or near the surface of solids.

Results

During runs IP-13 to IP-17, no solids were sampled by the probe due to a relatively small amounts of particles in the gas phase as a consequence of using reduced feed rates to increase the specific enthalpy. Only by shutting down the quench gas was it possible to collect solids in the filter cup (e.g., IP-18 and IP-19). Nevertheless, solids of Run IP-13 to IP-17, removed from filters but exposed to air for some minutes, were used to obtain qualitative results. Based on their analysis the yields presented in Table 9 were calculated.

The blank run IP-13, where CaO was fed to a hydrogen arc, showed no significant formation of $CaC_2$, although the abrasion on the graphite electrodes was quite severe. This suggests that the contribution of electrode derived carbon is negligible in comparison to carbon of the DBLC.

In run IP-14, some of the CaO was converted into calcium carbide (yield=12% of the CaO); the total DBLC carbon conversion to $CaC_2$ was 3.3%. 30% of the sodium of the DBLC fed emerged as $Na_2CO_3$; no sodium metal was detected. In run IP-15, the gap between the electrodes clogged and no material could be collected. After drying the CaO/DBLC sample at 105° C. in an oven overnight, no further problems with clogging appeared. One run, IP-16, was conducted with an argon arc without $H_2$, but no carbides were found. In run IP-17, the findings of run IP-14 were confirmed with a CaO to $CaC_2$ yield of 3.4 % of the DBLC total carbon and a somewhat higher sodium carbonate yield of 41.5% of the Na in the feed.

TABLE 9

Results For The Synthesis Of Carbide By Reaction Of DBLC And CaO In A Thermal Plasma

| Run N° [-] | H2-conc [%] | VH2,0 [l/min] | DBLC [g/min] | CaO [g/min] | C/Ca-ratio [mol/mol] | Power [kW] | $\Delta H_{spec}$ [kWh/kg-C] | CaO —Ca— converted to | | | |
|---|---|---|---|---|---|---|---|---|---|---|---|
| | | | | | | | | $X_{CaO}$ [%] | $Y_{CaO}$ [%] | $Y_{Ca}$ [%] | $Y_{CaC2}$ [%] |
| 13 | 78 | 15.0 | 0 | 4.7 | 0 | 27.3 | | 4.3 | 95.7 | 3.5 | 0.8 |
| 14 | 78 | 15.0 | 10.68 | 2.32 | 7.25 | 25.15 | 116.4 | 12.0 | 88.0 | 0.0 | 12.0 |
| 15 | 78 | 15.0 | 8.16 | 1.77 | 7.25 | 24.82 | 150.4 | 0.0 | 100.0 | | 12.0 |
| 16 | 0 | 22.0 | 10.68 | 2.32 | 7.25 | 18.9 | 87.5 | 1.5 | 98.5 | 0.0 | 1.5 |
| 17 | 75 | 13.0 | 10.68 | 2.32 | 7.25 | 27.5 | 127.3 | 12.2 | 87.8 | 0.0 | 12.2 |
| 18 | 75 | 13.0 | 10.68 | 2.32 | 7.25 | 24.6 | 113.9 | 80.7 | 19.3 | 0.0 | 80.7 |
| 19 | 75 | 12.5 | 10.68 | 2.32 | 7.25 | 24.6 | 113.9 | 40.6 | 59.4 | 0.0 | 40.6 |
| 20 | 75 | 13.0 | 10.58 | 2.14 | 7.87 | | | | | | |

| | DBLC —C— converted to | | | DBLC/CaO —O— converted to | | | Na2CO3 —Na— converted to | |
|---|---|---|---|---|---|---|---|---|
| Run N° [-] | $Y_{CaC2}$ [%] | $Y_{Na2CO3}$ [%] | $Y_{CO}$ [%] | $Y_{CaO}$ [%] | $Y_{CO}$ [%] | $Y_{Na2CO3}$ [%] | $Y_{Na2CO3}$ [%] | $Y_{Na}$ [%] |
| 13 | | | | 95.7 | | | — | — |
| 14 | 3.3 | 6.3 | 48.1 | 15.1 | 59.6 | 23.3 | 30.0 | 0.0 |
| 15 | 0.0 | 0.0 | 80.2 | 17.1 | 99.5 | 0.0 | | 0.0 |

TABLE 9-continued

| 16 | 0.4 | 14.3 | 18.6 | 16.9 | 23.1 | 53.2 | 68.4 | 0.0 |
|----|-----|------|------|------|------|------|------|-----|
| 17 | 3.4 | 8.7 | 49.8 | 15.0 | 61.8 | 32.3 | 41.5 | 0.0 |
| 18 | 22.3 | 3.8 | 74.6 | 3.3 | 92.4 | 14.2 | 18.3 | 23.6 |
| 19 | 11.2 | 10.0 | 63.5 | 10.2 | 78.7 | 37.3 | 48.0 | 0.0 |
| 20 | | | | | | | | |

Run IP-13: Control run with CaO, no DBLC
Run IP-15: Clogging of the reactor inlet apparently from excess moisture in the solid feed
Run IP-16: Argon as main gas
Run IP-13 to IP-17: Sampling problems
Run IP-18, IP-19: Best runs so far
Run IP-20: 50% DBLC and 50% DBL as carbon source, run aborted because of congestion of reactor inlet, apparently from sticky products of DBL However, in run IP-18, by shutting down the quench gas and by collecting a representative sample in the filter cup, a yield of 80.7% conversion of CaO to $CaC_2$ was obtained. By using the filter cup, the sample was maintained under an argon shield gas which guarded against exposure to ambient oxygen or moisture. This yield of 80.7% CaO to $CaC_2$ implies that 100% of the "carbideable char carbon" (i.e., CCC) or 22.3% of the total carbon of the DBLC was converted into $CaC_2$ because 25% excess of CaO was fed with respect to CCC. This yield was not reproduced in run IP-19, but a carbide yield of 40.6% was still obtained. This corresponds to conversions of about 50% of the CCC to $CaC_2$. In run IP-18, also an elemental sodium yield of 23.6% of the sodium in the feed was found.

After hydrolysis of the solid products with HCl, an odor of $H_2S$ was clearly perceptible upon opening the reaction flask, suggesting that some of the DBLC sodium combined with the DBLC sulfur to product $Na_2S$. Solid products from run IP-18 were analyzed by XRD and XPS. XRD gives information on the molecular identity of crystalline substances while XPS can identify particular types of chemical bonds at or near the surface of solids. The XRD spectrum (FIG. 6) confirmed the presence of $Na_2CO_3$ and of elemental Na. Further, it detected CaO and NaOH, as well as $Na_2S$ and $Na_2O_2$. The XRD spectrum was not calibrated for quantitative analyses. However, it was apparent that the $Na_2S$ and $Na_2O_2$ were present in small concentrations. The XRD measurements did not detect $CaC_2$ or $Na_2C_2$. This initially surprising result for $CaC_2$ is further discussed below. The XPS measurements (FIG. 7) detected sodium, carbon, and oxygen bonds, but not $Na_2C_2$ or $CaC_2$.

Because the presence of $CaC_2$ has already been established by wet chemical plus GC analyses, the absence of an XRD signal for $CaC_2$ suggests this compound may have been present in amorphous rather than crystalline form. This would be consistent with another finding of the XRD measurements on sample IP-18, namely that 60% of the solids are non-crystalline. The absence of $CaC_2$ in XPS suggests that this compound is absent from the near surface region of the product solids.

High conversions of the carbon in dried black liquor char (DBLC) to calcium carbide ($CaC_2$) have been demonstrated at bench scale (nominally 5 lb/hr solids feeds) using a plasma furnace. These conversions represent 50 to 100% of the apparent maximum amount of DBLC carbon available for carbide production. The maximum amount of carbon in DBLC that can be converted to $CaC_2$ is limited by the oxygen content of the DBLC, because this oxygen preferentially converts DBLC carbon to CO.

Sodium in the DBLC produces $Na_2CO_3$, elemental Na, $Na_2S$, NaOH, and $Na_2O_2$. Additional chemical analyses are needed to quantify the yields of the last three compounds. However, in an experiment showing essentially 100% conversion of available DBLC carbon to $CaC_2$, $Na_2CO_3$ and elemental Na respectively accounted for 18 and 24% of the DBLC sodium (Run IP-18, Table 9). If the $Na_2S$ qualitatively identified by X-ray diffraction accounts for most of the DBLC sulfur, it would consume 17% of the DBLC sodium.

Carbon monoxide is a major co-product of this process chemistry, accounting for most (78 to >90%) of the oxygen fed to the system as DBLC and as CaO.

A hydrogen arc is favorable versus an argon arc because it enables a higher absolute arc power, implying higher specific enthalpies, and can provide radicals for a rapid degradation of the solid feed.

A substantial fraction (almost ¼) of the DBLC Na is converted to elemental sodium (Run IP-18, Table 9). This can be readily converted to NaOH by hydrolysis, showing that this process chemistry does indeed provide for simplified recycle of pulping chemicals.

Likewise, $Na_2CO_3$ accounted for less than about ⅕ of the sodium in the DBLC, showing that the present process offers the possibility of substantially reduced loads on a recausticizer (Run IP-18, Table 9).

The following table illustrates potential maximum $CaC_2$ yields obtainable from various forms of biomass, assuming they obey similar process chemistries to those exhibited by the present DBLC:

TABLE 10

| Feedstock | C/O Ratio | Theoretical Maximum % Feed C Convertible to $CaC_2$ |
|-----------|-----------|---------------------------------------------------|
| Dried Black Liquor | 1.38 | 18 |
| Dried Black Liquor Char | 1.49 | 22 |
| Softwood Lignin | 2.84 | 43 |
| Hardwood Lignin | 2.36 | 38 |
| Douglas Fir | 1.72 | 28 |
| Douglas Fir Bark | 2.04 | 34 |
| Maple | 1.62 | 26 |
| Cellulose | 1.20 | 13 |
| Various Hemicelluloses | 1.00 | 0 |
| Methane | N.A. | 67 |

Table 10 shows that lignin and lignin rich wastes provide appreciably higher $CaC_2$ yields than the DBLC. Note however that even for the limiting case of zero oxygen in the feed, illustrated here by methane, the maximum amount of feedstock carbon convertible to $CaC_2$ is ⅔, owing to the consumption of ⅓ of the feed carbon by the oxygen in the CaO. Thus, the higher the C/O ratio of the biomass or pulping waste feedstock, the greater the yields of $CaC_2$. Similarly, in processing pulping wastes of especially low C/O ratio (e.g., materials rich in hemicellulosees), $CaC_2$ yields can be enhanced by mixing in other feeds of higher C/O ratio, e.g., wood wastes, bark, waste oils, or even natural gas or petroleum substances, when such is available at low cost.

The invention has been described in detail with reference to preferred embodiments thereof. However, it will be appreciated that, upon consideration of the present specification and drawings, those skilled in the art may make modifications and improvements within the spirit and scope of this invention as defined by the claims.

What is claimed is:

1. A continuous process for the conversion of biomass, which contains carbon, to form a chemical feedstock, the process comprising:
   continuously feeding into a reaction chamber at a temperature of at least 1400° C. a biomass material and an exogenous metal oxide or metal oxide precursor, wherein the metal oxide and the metal oxide precursor are selected from MgO and precursors thereof, wherein the metal oxide and precursor is capable of forming a hydrolizable metal carbide, to form reaction products including said metal carbide; and
   quenching the reaction products to a temperature of 800° C. or less.

2. The process of claim 1, wherein the biomass contains significant amounts of sodium and wherein the reaction products further include a product selected from the group consisting of Na, NaOH, $Na_2O_2$ and $Na_2S$.

3. The process of claim 2, wherein at least 10% of the sodium in the biomass is recovered as elemental Na.

4. The process of claim 2, wherein the biomass contains sulfur and wherein at least 10% of the sulfur in the biomass is recovered as $Na_2S$.

5. The process of claim 1, wherein the biomass is a material selected from the group consisting of wood; municipal waste; trees or parts thereof forest product residues; energy crops; straw; grass; animal, agricultural and human wastes; sewage sludge; and living or dead plants.

6. The process of claim 1, wherein the biomass is a waste pulping liquor and wherein the reaction products further include a product selected from the group consisting of Na, NaOH, $Na_2O_2$ and $Na_2S$.

7. The process of claim 6, wherein at least 10% of sodium in the biomass is recovered as elemental Na.

8. The process of claim 6, wherein the biomass contains sulfur and wherein at least 10% of the sulfur in the biomass is recovered as $Na_2S$.

9. The process of claim 1, wherein the reaction products further comprise CO and $H_2$.

10. The process of claim 1, wherein the biomass material is entrained in a stream of hydrogen.

11. A continuous process for the conversion of a biomass, which contains carbon, to form a chemical feedstock, the process comprising:
    continuously feeding into a reaction chamber at a temperature of at least 1400° C. a biomass material and an exogenous metal oxide or metal oxide precursor, wherein the metal oxide and the metal oxide precursor are selected from CaO and precursors thereof, wherein the metal oxide and precursor is capable of forming a hydrolizable metal carbide, to form reaction products including said metal carbide; and
    quenching the reaction products to a temperature of 800° C. or less, wherein the one or more metal carbides are hydrolyzed to produce acetylene.

12. The process of claim 11, wherein the biomass contains significant amounts of sodium and wherein the reaction products further include a product selected from the group consisting of Na, NaOH, $Na_2O_2$ and $Na_2S$.

13. The process of claim 12, wherein at least 10% of the sodium in the biomass is recovered as elemental Na.

14. The process of claim 12, wherein the biomass contains sulfur and wherein at least 10% of the sulfur in the biomass is recovered as $Na_2S$.

15. The process of claim 11, wherein at least 10% of the carbideable carbon in the biomass is converted to metal carbide.

16. The process of claim 11, wherein at least 50% of the carbideable carbon in the biomass is converted to metal carbide.

17. The process of claim 11, wherein the biomass is a material selected from the group consisting of wood; municipal waste; trees or parts thereof; forest product residues; energy crops; straw; grass; animal, agricultural and human wastes; sewage sludge; and living or dead plants.

18. The process of claim 11, wherein the reaction products further comprise CO and $H_2$.

19. The process of claim 11, wherein the temperature in the reaction chamber is provided by a plasma arc.

20. The process of claim 11, wherein the biomass material is entrained in a stream of hydrogen.

21. The process of claim 11, further comprising separating the resulting metal carbide from the reaction products.

22. The process of claim 11, wherein the quenching step utilizes water and produces a recoverable hydrocarbon gas.

23. A continuous process for the conversation of a biomass, which contains carbon, to form a chemical feedstock, the process comprising:
    continuously feeding into a reaction chamber at a temperature of at least 1400° C. a biomass material and an exogenous metal oxide or metal oxide precursor, wherein the metal oxide and the metal oxide precursor are selected from CaO and precursors thereof, wherein the metal oxide and precursor is capable of forming a hydrolizable metal carbide, to form reaction products including said metal carbide; and
    quenching the reaction products to a temperature of 800° C. or less, wherein the one or more metal carbides are hydrolyzed to produce acetylene, and wherein ethylene is produced from the acetylene.

24. The process of claim 11, wherein the biomass is dried prior to the reaction chamber.

25. The process of claim 11, wherein the exogenous metal oxide or metal oxide precursor is added in an amount sufficient such that, after oxygen in the biomass is converted to carbon monoxide, an amount of carbon remaining from the biomass is converted to carbide of the metal in the exogenous metal oxide or metal oxide precursor.

26. The process of claim 25, wherein substantial portions of the amount of carbon remaining from the spent pulping liquor is converted to carbide of the metal in the exogenous metal oxide or metal oxide precursor.

27. A continuous process for the conversion of spent pulping liquor to form a chemical feedstock, the process comprising:
    continuously feeding into a reaction chamber at a temperature of at least 1400° C. spent pulping liquor and an exogenous metal oxide or metal oxide precursor, wherein the metal oxide and precursor are capable of forming a hydrolizable metal carbide, to form reaction products including said metal carbide; and
    quenching the reaction products to a temperature of 800° C. or less.

28. The process of claim 27, wherein the spent pulping liquor contains significant amounts of sodium and wherein the reaction products further include a product selected from the group consisting of Na, NaOH, $Na_2O_2$ and $Na_2S$.

29. The process of claim 28, wherein at least 10% of the sodium in the spent pulping liquor is recovered as elemental Na.

30. The process of claim 28, wherein the spent pulping liquor contains sulfur and wherein at least 10% of the sulfur in the spent pulping liquor is recovered as $Na_2S$.

31. The process of claim 27, wherein at least 10% of carbideable carbon in the spent pulping liquor is converted to metal carbide.

32. The process of claim 27, wherein at least 50% of the carbideable carbon in the spent pulping liquor is converted to metal carbide.

33. The process of claim 27, wherein the reaction products further comprise CO and $H_2$.

34. The process of claim 27, wherein the temperature in the reaction chamber is provided by a plasma arc.

35. The process of claim 27, wherein the spent pulping liquor is entrained in a stream of hydrogen.

36. The process of claim 27, further comprising separating the resulting metal carbide from the reaction products.

37. The process of claim 27, wherein the quenching step utilizes water and produces a recoverable hydrocarbon gas.

38. The process of claim 27, wherein the exogenous metal oxide or metal oxide precursor is added in an amount sufficient such that, after oxygen in the spent pulping liquor is converted to carbon monoxide, an amount of carbon remaining from the spent pulping liquor is converted to carbide of the metal in the exogenous metal oxide or metal oxide precursor.

39. The process of claim 38, wherein substantial portions of the amount of carbon remaining from the spent pulping liquor is converted to carbide of the metal in the exogenous metal oxide or metal oxide precursor.

40. The process of claim 27, wherein the spent pulping liquor is dried prior to the reaction chamber.

41. A continuous process for the conversion of biomass to form a chemical feedstock, the process comprising:

continuously feeding into a reaction chamber at a temperature of at least 1400° C. biomass and an exogenous metal oxide or metal oxide precursor selected from CaO and precursors thereof to form reaction products including calcium carbide; and quenching the reaction products to a temperature of 800° C. or less.

42. The process of claim 41, wherein the biomass contains significant amounts of sodium and wherein the reaction products further include a product selected from the group consisting of Na, NaOH, $Na_2O_2$ and $Na_2S$.

43. The process of claim 42, wherein at least 10% of the sodium in the biomass is recovered as elemental Na.

44. The process of claim 42, wherein the biomass contains sulfur and wherein at least 10% of the sulfur in the biomass is recovered as $Na_2S$.

45. The process of claim 41, wherein at least 10% of carbideable carbon in the biomass is converted to metal carbide.

46. The process of claim 45, wherein at least 50% of the carbideable carbon in the biomass is converted to metal carbide.

47. The process of claim 41, wherein the reaction products further comprise CO and $H_2$.

48. The process of claim 41, wherein the biomass is entrained in a stream of hydrogen.

49. The process of claim 41, further comprising separating the resulting metal carbide from the reaction products.

50. The process of claim 41, wherein the exogenous metal oxide or metal oxide precursor is added in an amount sufficient such that, after oxygen in the biomass is converted to carbon monoxide, an amount of carbon remaining from the biomass is converted to carbide of the metal in the exogenous metal oxide or metal oxide precursor.

51. The process of claim 50, wherein substantial portions of the amount of carbon remaining from the spent pulping liquor is converted to carbide of the metal in the exogenous metal oxide or metal oxide precursor.

* * * * *